US007015941B2

(12) United States Patent
Malloy Desormeaux

(10) Patent No.: US 7,015,941 B2
(45) Date of Patent: *Mar. 21, 2006

(54) HYBRID CAMERAS THAT DOWNLOAD ELECTRONIC IMAGES IN SELECTED GEOMETRIC FORMATS AND METHODS

(76) Inventor: Stephen G. Malloy Desormeaux, Eastman Kodak Company, 343 State St., Rochester, NY (US) 14650

( * ) Notice: Subject to any disclaimer, the term of this patent is extended or adjusted under 35 U.S.C. 154(b) by 655 days.

This patent is subject to a terminal disclaimer.

(21) Appl. No.: 09/976,326

(22) Filed: Oct. 12, 2001

(65) Prior Publication Data

US 2004/0201749 A1 Oct. 14, 2004

(51) Int. Cl.
- H04N 7/18 (2006.01)
- H04N 9/47 (2006.01)
- H04N 5/228 (2006.01)
- H04N 5/76 (2006.01)

(52) U.S. Cl. ............... 348/64; 348/231.99; 348/222.1
(58) Field of Classification Search ............ 348/64, 348/207.99, 231.1–231.99, 220.1, 222.1; 396/311, 429; 358/906, 909.1
See application file for complete search history.

(56) References Cited

U.S. PATENT DOCUMENTS

| | | | |
|---|---|---|---|
| 4,714,962 A | | 12/1987 | Levine |
| 5,023,635 A * | | 6/1991 | Nealon ................ 396/311 |
| 5,027,221 A | | 6/1991 | Hisatake et al. |
| 5,164,831 A * | | 11/1992 | Kuchta et al. .......... 348/231.7 |
| 5,432,532 A | | 7/1995 | Mochimaru et al. |
| 5,477,289 A | | 12/1995 | Smart |
| 5,485,554 A | | 1/1996 | Lowitz et al. |
| 5,619,257 A * | | 4/1997 | Reele et al. ............ 348/64 |
| 5,619,738 A * | | 4/1997 | Petruchik et al. ....... 396/311 |
| 5,749,006 A | | 5/1998 | McIntyre et al. |
| 5,774,754 A | | 6/1998 | Ootsuka |
| 5,845,166 A | | 12/1998 | Fellegara et al. |
| 5,870,638 A | | 2/1999 | Kurosawa |
| 5,926,218 A * | | 7/1999 | Smith ................... 348/207.99 |
| 5,950,031 A * | | 9/1999 | Yamagata .............. 396/429 |
| 5,966,553 A | | 10/1999 | Nishitani et al. |
| 5,978,016 A | | 11/1999 | Lourette et al. |
| 5,986,297 A | | 11/1999 | Guidash et al. |
| 6,014,165 A | | 1/2000 | McIntyre et al. |
| 6,278,447 B1 * | | 8/2001 | Anderson .............. 715/723 |
| 6,321,040 B1 * | | 11/2001 | Wess et al. ............ 396/311 |
| 6,496,655 B1 * | | 12/2002 | Malloy Desormeaux .... 396/311 |
| 6,501,911 B1 * | | 12/2002 | Malloy Desormeaux .... 396/311 |
| 6,505,003 B1 * | | 1/2003 | Malloy Desormeaux .... 396/429 |
| 6,549,307 B1 * | | 4/2003 | Makishima et al. ... 348/333.11 |
| 2004/0201742 A1 * | | 10/2004 | Malloy Desormeaux . 348/231.6 |

FOREIGN PATENT DOCUMENTS

| | | |
|---|---|---|
| EP | 0 543 180 A | 5/1993 |
| EP | 0 864 916 A | 9/1998 |
| EP | 0 864 916 A1 | 9/1998 |

\* cited by examiner

Primary Examiner—Thai Tran
Assistant Examiner—Kelly Jerabek
(74) Attorney, Agent, or Firm—Robert L. Walker

(57) ABSTRACT

In a camera and method, a plurality of image pairs are captured. Each image pair has an archival image of a scene and an initial electronic image of the same scene. The archival image of each pair has a first geometric format. The initial electronic images are stored in memory. A designation of a alternative geometric format different than the first geometric format is recorded in association with selected image pairs. The initial electronic images of the selected image pairs are reformatted to respective alternative geometric formats to provide formatted electronic images. The formatted electronic images are downloaded.

20 Claims, 22 Drawing Sheets

HYBRID CAMERAS THAT DOWNLOAD ELECTRONIC IMAGES IN SELECTED GEOMETRIC FORMATS AND METHODS

CROSS REFERENCE TO RELATED APPLICATIONS

Reference is made to commonly assigned, co-pending U.S. patent applications Ser. No. 09/976,344, entitled: HYBRID CAMERAS HAVING ELECTRONIC IMAGE CONVERSION TO SELECTED GEOMETRIC FORMATS AND METHODS, filed 12 Oct. 2002, in the name of Stephen G. Malloy Desormeaux; Ser. No. 09/976,583, entitled: CAMERAS HAVING FILM UNIT DEPENDENT DEMONSTRATION MODE IMAGE DELETION AND METHODS, filed 12 Oct. 2001, in the names of Stephen G. Malloy Desormeaux and Robert Luke Walker, Ser. No. 09/976,489, entitled: HYBRID CAMERAS THAT REVISE STORED ELECTRONIC IMAGE METADATA AT FILM UNIT REMOVAL AND METHODS, filed 12 Oct. 2001, in the name of Stephen G. Malloy Desormeaux; Ser. No. 09/976,973, entitled: HYBRID CAMERAS THAT DOWNLOAD ELECTRONIC IMAGES WITH REDUCED METADATA AND METHODS, filed 12 Oct. 2001, in the name of Stephen G. Malloy Desormeaux, and Ser. No 09/976,306, entitled: HYBRID CAMERAS HAVING OPTIONAL IRREVERSIBLE CLEARANCE OF ELECTRONIC IMAGES WITH FILM UNIT, filed 12 Oct. 2001, in the name of Stephen G. Malloy Desormeaux.

FIELD OF THE INVENTION

The invention relates to photography and photographic equipment and methods and more particularly relates to cameras and methods in which electronic images are downloaded in selected geometric formats.

BACKGROUND OF THE INVENTION

A continuing problem in the manipulation of digital images has been the size of the images relative to the capacity of the infrastructure required to manipulate those images. This particularly relates to bandwidth of network connections, but also relates to such things as the speed of connected communication ports of cameras and computers. This problem has led to digital camera users physically transferring removable memory elements to obtain photofinishing. This has the inconveniences of transferring film and, unlike photographic film, in many cases also risks damage or loss to an expensive memory element. This risk is resolved by some hybrid cameras which allow for the transfer of archival images in a film unit and at the same time provide immediate image review and electronic image downloading. In hybrid cameras, electronic images can be limited to a lower resolution than corresponding archival images so as to increase the speed of downloading. This is helpful, but further reductions in the time required for downloading are desirable.

Hybrid electronic-film cameras allow photographers to capture scene images (the light images of particular scenes) as latent images on photographic film and as electronic images that are digitized and stored in memory. Metadata corresponding to the images is also written to the memory and film. Metadata can include designations of geometric formats to be used in photofinishing of the film. The electronic images are retained in the memory until being overwritten or being removed, such as by withdrawal of a removable memory unit. The electronic images are made available for use by downloading into a computer or other device. The photographer is generally allowed to view electronic images in the memory of the camera.

In U.S. Pat. Nos. 5,978,016 and 5,845,166 the hybrid cameras have a hybrid capture mode, in which a captured electronic image is initially stored as a "working image" in an aspect ratio matching that of a concurrent film image. Each electronic image is then transferred to another memory for storage in an aspect ratio matching the corresponding film frame. The aspect ratios correspond to the C, H, and P print formats of APS film and the C and P aspect ratio electronic images are cropped in the same manner as APS film images. The cropped electronic images save space in memory, but still match the format of the corresponding film frames of a film unit loaded in the camera.

The C, H, and P print formats of APS film can be recorded on a respective APS film unit as magnetically recorded metadata on a layer of the filmstrip. APS cameras are available that allow some magnetically recorded metadata for an image to be changed after capture of that image. For example, the number of prints wanted can be changed or set to zero.

It would thus be desirable to provide improved cameras and methods in which download times are reduced and downloaded images are like corresponding photofinished images.

SUMMARY OF THE INVENTION

The invention is defined by the claims. The invention, in its broader aspects, provides cameras and methods, in which a plurality of image pairs are captured. Each image pair has an archival image of a scene and an initial electronic image of the same scene. The archival image of each pair has a first geometric format. The initial electronic images are stored in memory. A designation of an alternative geometric format different than the first geometric format is recorded in association with selected image pairs. The initial electronic images of the selected image pairs are reformatted to respective alternative geometric formats to provide formatted electronic images. The formatted electronic images are downloaded.

It is an advantageous effect of the invention that improved cameras and methods are provided in which download times are reduced and downloaded images are like corresponding photofinished images.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
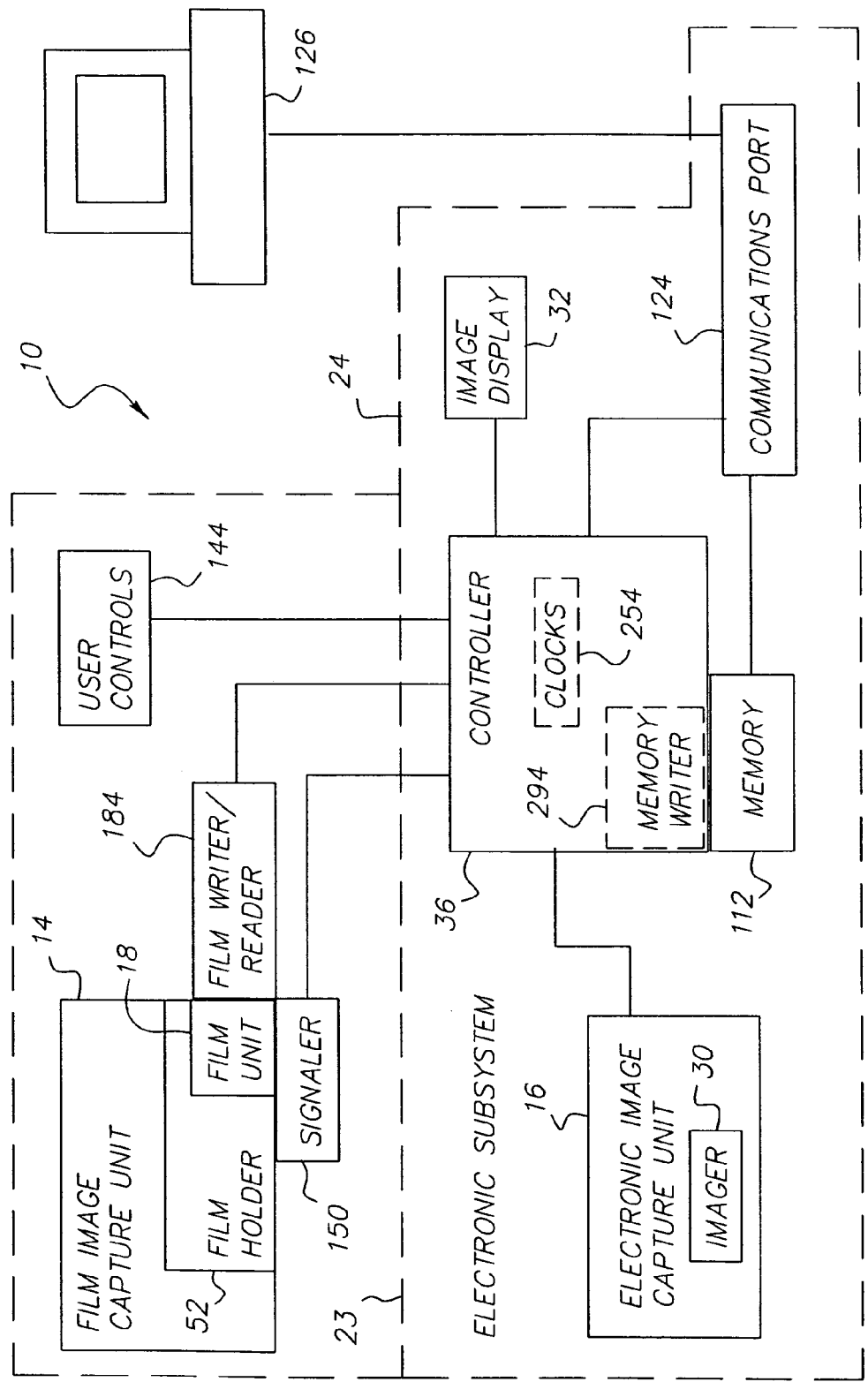
FIG. 1 is a diagrammatical view of an embodiment of the camera and a personal computer.

In the following, feature sets of the several different cameras and methods are discussed in terms of particular embodiments combining all or many of those features. Alternative embodiments combining fewer features and alternative features are also discussed herein. Other alternatives will be apparent to those of skill in the art.

The cameras herein each provide both an archival image of a scene and an evaluation image of the same scene. The archival image and the evaluation image are captured concurrently. The archival image is later used in photofinishing, or printing, or other long term or relatively long term use. The evaluation image is immediately available for display and review by the user.

Some of the cameras discussed herein have embodiments with a single electronic imager that is used to capture a scene image as an initial electronic image. Both an archival image and an evaluation image are generated from the initial electronic image. The evaluation image can be subsampled from an original electronic image so as to provide lower resolution derived images. The lower resolution derived images can be provided using the method described in commonly-assigned U.S. Pat. No. 5,164,831, entitled "ELECTRONIC STILL CAMERA PROVIDING MULTI-FORMAT STORAGE OF FULL AND REDUCED RESOLUTION IMAGES", to Kuchta, et. al.

In currently preferred embodiments, the cameras 10 have a capture system that has an archival image capture unit 14 and a separate evaluation image capture unit 16. The two different capture units 14,16 can take a variety of forms and can be completely separate from each other or can share some or most components. The evaluation image capture unit 16 captures a scene image electronically and can also be referred to as an electronic image capture unit 16. The archival image capture unit 14 captures and stores images in a flim unit 18.

The term "film unit" is used herein to refer to media 20 on which image data is or can be stored for archival purposes with or without media modification, and physically associated structures 22 supporting use of the media 20. Each film unit 18 stores or can store a plurality of archival images. In a film-type film unit 18, the media 20 is a photographic filmstrip 20a. The support structure 22 of a film-type film unit 18a generally provides light blocking and, for example, can include a spool 22a on which the filmstrip 20a is wound and canister 22b enclosing the filmstrip 20a and spool 22a. In an electronic-type film unit 18, the media 20 is removable digital storage media. With digital storage media, archival images are transferred in digital form for photofinishing, printing, or other use. An electronic-type film unit 18, like a photographic film unit 18 is removable from the camera 10. The term "film unit" is not used herein to refer to non-removable digital storage media. The type of digital media used and the manner of information storage, such as optical, magnetic, or electronic, is not critical. For example, a digital film unit can be a floppy disc, a CD, a DVD, a tape cassette, or flash memory card or stick. It is currently preferred that the film unit provide non-erasable storage of image information. This prevents any occurrence of accidental erasure, by rerecording over a used film unit or the like. Photographic film is non-erasable in this manner, as are some types of digital storage media, such as write-once compact discs.

The evaluation image capture unit 16 captures electronic images. The archival image capture unit 14 is generally described herein in terms of a photographic film image capture unit 14a that captures images on photographic film. The camera 10 is not limited thereby. For example, as an alternative, the archival image capture unit 14 and evaluation image capture unit 16 can be two different electronic capture units. An example of a suitable digital camera having two such electronic capture units is described in U.S. Pat. No. 5,926,218, entitled "ELECTRONIC CAMERA WITH DUAL RESOLUTION SENSORS", to Smith.

The camera 10 can also alternatively allow use of either a film image capture unit or an electronic capture unit as the archival image capture unit 14, at the selection of the photographer or on the basis of available storage space in one or another capture media or on some other basis. For example, a switch (not separately illustrated) can provide alternative film capture and electronic capture modes.

The invention is generally discussed herein in terms of film units 18a that use photographic film for storage of archival images as latent images and, optionally, store some additional information in the film unit 18, magnetically, optically, or both. It will be understood that equivalent considerations apply to other types of film units 18. For example, units of digital memory for individual archival images correspond to film frames (discussed in detail below).

Camera 10 features disclosed herein are particularly advantageous for hybrid cameras having archival image units that capture images using photographic film-type film units as archival media and also having electronic image units that capture the evaluation images. The electronic image unit 16 in a camera 10 is part of an electronic subsystem 23 that also includes an image display 32 for reviewing the captured electronic images. This is not limiting. Electronic-type film units can be used in place of photographic film-type film units. Some features are advantageous for electronic cameras that do not use a film unit, that is, cameras that store images only on internal memory. Advantages of specific embodiments will be readily apparent by simple experimentation implementing the particular features.

Camera Features

Referring now particularly to FIGS. 1–4, the camera 10 has a body 24 that holds a capture system 12 having an archival image capture unit 14 that uses photographic film 20a and an evaluation image capture unit 16 that captures images electronically. When the photographer trips a shutter release 26, a subject image (a light image of a scene) is captured as a latent image on a frame 28 of the film 20a and at least one electronic image is captured on an electronic array imager 30 of the evaluation image capture unit 16. The electronic image or images are digitally processed and used to provide one or more derived images that can be shown on an image display 32 mounted to the body 24.

The electronic images, as captured in analog form and after digitization, but not other modification, are referred to generically herein as "original electronic images". After further modification, the electronic images are referred to generically herein by the term "derived images". Derived images are modified relative to the original images. This can be for calibration to the display or a particular file structure, or matching to output media. These modifications may or may not also include the addition of image metadata to the electronic image file. A derived image that is matched to the expected product of photofinishing the archival image is also referred to herein as a "verification image". More than one derived image can be made from a single original electronic image. A derived image that differs from the verification image in a predetermined manner, unrelated to expected photofinishing, is referred to herein as an "evaluation image". Modifications matched to expected photofinishing or other downstream use, may or may not also be present in an evaluation image. The term "initial electronic image" is used herein to refer to either an original electronic image or a derived image that retains the same image content as the original electronic image. The initial electronic image may be a derived image that has been subjected to image improvements, such as anti-aliasing, color correction and the like, that increase objective and subjective matching to the scene photographed.

The camera can be limited to a mode in which a film image and a corresponding electronic image are captured at every capture event. It is preferred that the camera is selectively switchable by the user, between two modes: a film and electronic capture mode and an electronic-only capture mode. The camera can alternatively provide three modes: a film and electronic capture mode, an electronic-only capture mode, and a film only capture mode in which no electronic image is captured. This approach is not preferred, because this mode lacks the benefit of reviewing a verification image after scene capture.

A control system 34 that includes a controller 36 (also referred to herein as a microcomputer) and can also include a digital signal processor 38, controls other components of the camera 10 and performs processing related to the derived image.

The camera body 24 provides structural support and protection for the capture units 14,16 and other components. The body 24 of the camera 10 can be varied to meet requirements of a particular use and style considerations. It is convenient, if the body 24 has front and rear covers 40,42 joined together over a chassis 44. Many of the components of the camera 10 can be mounted to the chassis 44.

A film door 46 and a flip-up electronic flash unit 48 are pivotably joined to the covers 40,42 and chassis 44. The flash unit 48 is flipped up from partially covering the front cover 40 to uncover the taking lens 50, preparatory to using the camera 10. Flipping up the flash unit 48 closes a normally open main power switch 51 to electrically power on the camera 10. The type of main power switch 51 used and its manner of operation can be varied as desired. A power supply 53 accessed through the main power switch 51 is ordinarily one or more batteries.

The film image capture unit 14 has a film holder 52 that holds a film unit 18 during use within a light-tight film space 49. In the camera 10 of FIGS. 3–4, the film holder 52 is part of the chassis 44. The configuration of the film holder 52 is a function of the type of film unit 18 used and is not otherwise significant.

The film holder 52 includes a pair of film chambers 54,56 and a rearwardly opening exposure frame 58 between the film chambers 54,56. The film unit 18 has a canister 22b disposed in one of the chambers 54,56. A filmstrip 20a is wound around a spool 22a held by the canister 22b. During use, the filmstrip 20a extends across the exposure frame 58 and is wound into a film roll 60 in the other chamber 56. The exposure frame 58 has an opening 62 through which a light image exposes a frame 28 of the film at each picture-taking event.

During use, the filmstrip 20a is moved by a film transport 64 out of the canister 22b of the film unit, is wound into a film roll 60 in the supply chamber 56, and is then returned to the canister 22b. The film transport 64, as illustrated, includes an electric motor 66 located within a film roll spool 68, but other types of motorized transport mechanisms and manual transports can also be used. Filmstrip exposure can be on film advance or on rewind.

Figure 3:
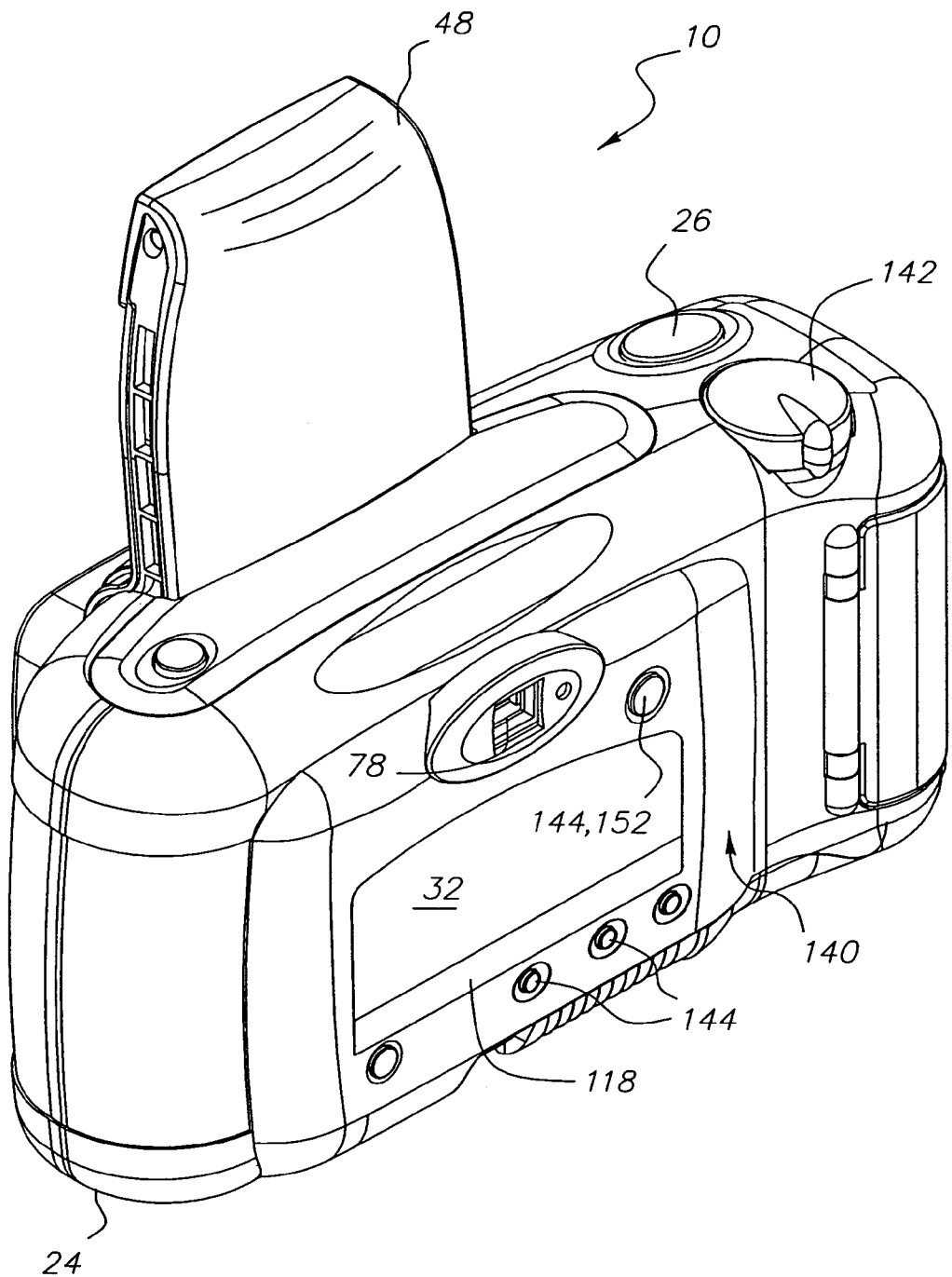
FIG. 3 is a perspective view of the camera of FIG. 2.
Figure 4:
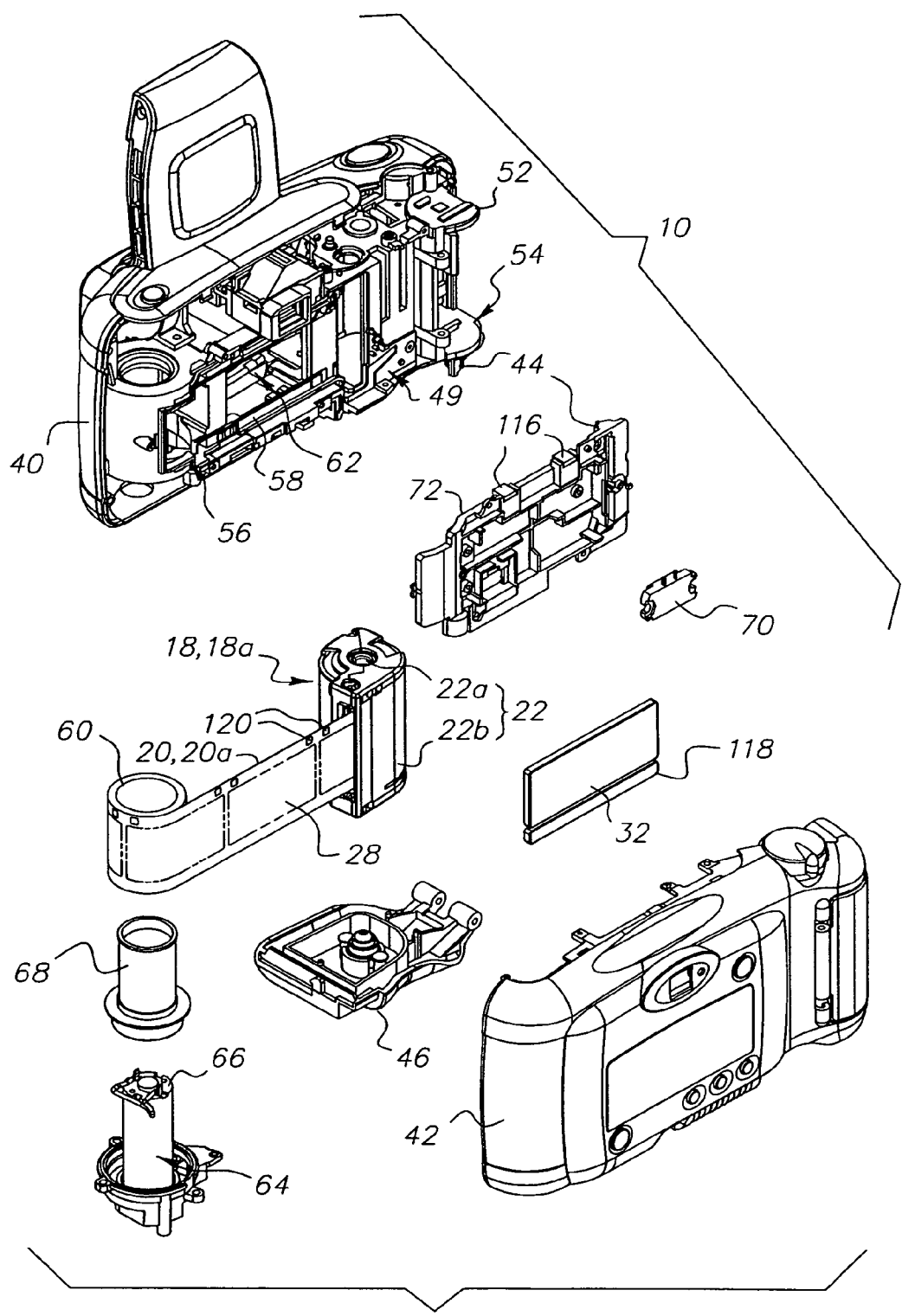
FIG. 4 is an exploded perspective view of the camera of FIG. 2.

The camera 10 shown in FIGS. 3–4 is reloadable and has motorized film transport. The camera 10 uses an Advanced Photo System ("APS") film cartridge. Other types of one or two chamber film cartridge and roll film can also be used. It is currently preferred that the camera 10 is reloadable. The camera 10 can have an IX-DX code reader (not separately illustrated) to determine the film type and number of film frames. The APS filmstrip 20a is normally housed in an opaque film cartridge and is typically available in 15-exposure, 25-exposure, and 40-exposure lengths.

The APS filmstrip 20a has a transparent magnetic overlay (not illustrated) which gives it a magnetic recording capacity to store various metadata such as number of prints ordered and print aspect ratio, along a magnetic information track adjacent each exposed film frame 28. The camera 10 has a data recorder 70 positioned adjoining the filmstrip 20a to record the metadata. FIGS. 3–4 illustrate an APS camera 10 with a data recorder 70 in the form of a magnetic head mounted within an opening in a film pressure platen 72 for magnetically recording the metadata along the magnetic information track adjacent each one of the exposed film frames 28, when the exposed film length is advanced out of the film cartridge. The film pressure platen 72 serves to support each film frame 28 flat for exposure at the exposure frame 58.

Metadata, including user-selected information, can differ from frame-to-frame. With an APS film unit, the information recorded includes: an optional print title in English or other language; an optional print exposure correction (increase/decrease); a designation of a print format selected from "C" (classic), "H" (HDTV) and "P" (panoramic); and a print quantity number. A print having a "C" format is typically 4 (height)×6 (width) inches. A print having a "H" format is typically 4 (height)×7 (width) inches. A print having a "P" format is typically 4 (height)×10 (width) inches or 4 (height)×11.5 9 (width) inches. No matter which one(s) of the print formats is (are) selected, "C", and/or "H" and/or "P", the exposed frames on the filmstrip 14 are always in the "H" format. As is known, this allows reprints to be made in any of the three formats rather than just in the selected format. The photographer can select desired characteristics, including whether to print an image in a "C", "H", or "P" print format and the number of prints.

The camera has generally been described in relation to the types of metadata available with APS film. The camera is not limited to such image metadata. Other metadata can also be used, with the understanding that the photofinishing infrastructure must also be provided to allow realization of desired effects. It is preferred, in all cases, that the user be able to view on the image display the expected results upon photofinishing.

The cameras 10 herein are not limited to APS film units nor to recording metadata on a magnetic layer. Optical recording of metadata by cameras is well known in the art, as are other means of storing such information such as use of memory media attached to a film canister. Information including the kinds of metadata provided by APS cameras and films, can be written, or read, or both by any means well known to those of skill in the art. Editing parameters in the form of image metadata can be provided as part of the image file of an electronic archival image. The metadata is then used in photofinishing or production of other output using the image file. In another alternative embodiment, the archival image is electronic and is modified in accordance with the indicated parameters. As elsewhere indicated, discussion here is generally directed to embodiments in which archival images are captured on photographic film. Like considerations apply to other embodiments.

Frames 28 of the filmstrip 20*a* are temporarily positioned, one at a time, in the exposure frame 58, for archival image exposure. The film roll spool 68 is incrementally rotated following each film frame exposure, to wind the most-recently exposed one of the film frames 28 onto an exposed film roll 60 on the spool 68 and to position a fresh unexposed film frame 28 at the exposure frame 58. When the film roll spool 68 is incrementally rotated by the film transport 64, the filmstrip 20*a* is advanced forward one frame increment (which is slightly greater than a frame width) from the film cartridge. Film transport is controlled by the controller 36. When substantially the entire length of the filmstrip 20*a* is exposed, i.e. the total number of available frames 28 are exposed, a spindle (not shown) which projects into a cavity in a top end of a film spool 22*a* inside the film cartridge is continuously rotated by the film drive 64 using a suitable gear train (not shown) to rewind the exposed film length rearward into the film cartridge.

To magnetically record metadata on the filmstrip 20*a*, the magnetic track or tracks on the filmstrip 20*a* are moved past the data recorder 70 (also referred to herein as a "film writer") at an appropriate speed while a field is generated in a recording head (not shown) of the recorder 70. The recording can be done stepwise, moving the filmstrip 20*a* in increments for each film frame 28 or the data can be stored in memory in the camera 10 until all film exposures are completed, then all the data can be recorded in a single continuous pass. When all film exposures are completed, metadata has been recorded, and the filmstrip 20*a* is light-tightly closed in the film canister 22*b*, the film unit 18 can be removed from the camera 10 by opening the film door 46.

The electronic image capture unit 16 has an electronic array imager 30 driven by an imager driver 74. The electronic array imager 30 is configured so as to capture, for each picture-taking event, one or more electronic images that correspond to a latent image concurrently captured on the filmstrip 20*a*. The type of imager 30 used may vary, but it is highly preferred that the imager 30 be one of the several solid-state imagers available.

One highly popular type of solid-state imager commonly used is the charge coupled device ("CCD"). Of the several CCD types available, two allow easy electronic shuttering and thereby are preferable in this use. The first of these, the frame transfer CCD, allows charge generation due to photoactivity and then shifts all of the image charge into a light shielded, non-photosensitive area. This area is then clocked out to provide a sampled electronic image. The second type, the interline transfer CCD, also performs shuttering by shifting the charge, but shifts charge to an area above or below each image line so that there are as many storage areas as there are imaging lines. The storage lines are then shifted out in an appropriate manner. Each of these CCD imagers has both advantages and disadvantages, but all will work in this application. A typical CCD has separate components that act as clock drivers, analog signal processor-analog/digital converter (also referred to as "A/D converter 114").

It is also possible to use an electronic image sensor manufactured with CMOS technology. This type of imager is attractive for use, since it is manufactured easily in a readily available solid-state process and lends itself to use with a single power supply. In addition, the process allows peripheral circuitry to be integrated onto the same semiconductor die. For example, a CMOS sensor can include clock drivers, the A/D converter 114, and other components integrated on a single IC. A third type of sensor that can be used is a charge injection device (CID). This sensor differs from the others mentioned in that the charge is not shifted out of the device to be read. Reading is accomplished by shifting charge within the pixel. This allows a nondestructive read of any pixel in the array. If the device is externally shuttered, the array can be read repeatedly without destroying the image. Shuttering can be accomplished by external shutter or, without an external shutter, by injecting the charge into the substrate for recombination.

The electronic image capture unit 16 captures a three-color image. It is highly preferred that a single imager be used along with a three-color or four-color filter, however, multiple monochromatic imagers and filters can be used. Suitable three-color filters are well known to those of skill in the art, and are normally incorporated with the imager to provide an integral component. For convenience, the camera 10 is generally discussed herein in relation to embodiments having a single imager 30 with a three color filter (not separately illustrated). It will be understood that like considerations apply to cameras using more than three colors as well as cameras using multiple monochromatic imagers.

Figure 2:
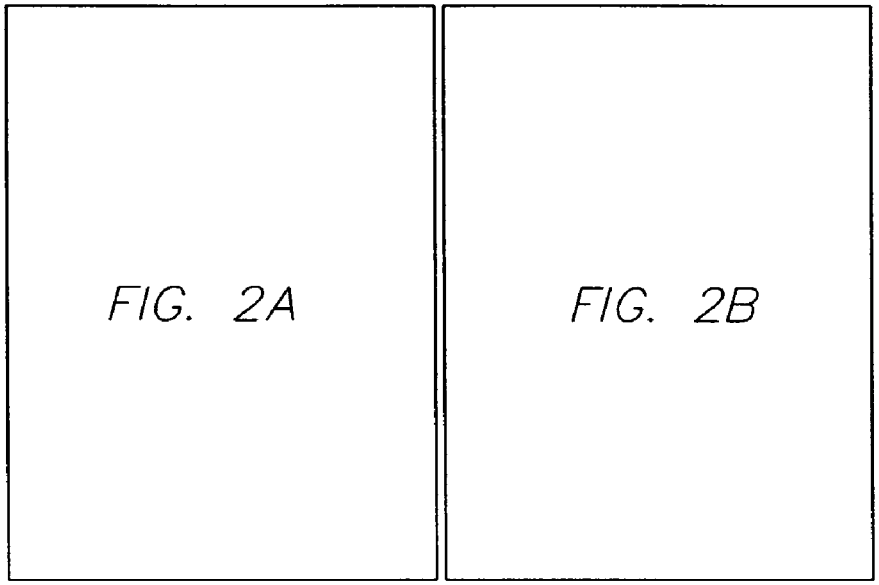
FIGS. 2–2B present a schematic diagram of another embodiment of the camera.
Figure 2A:
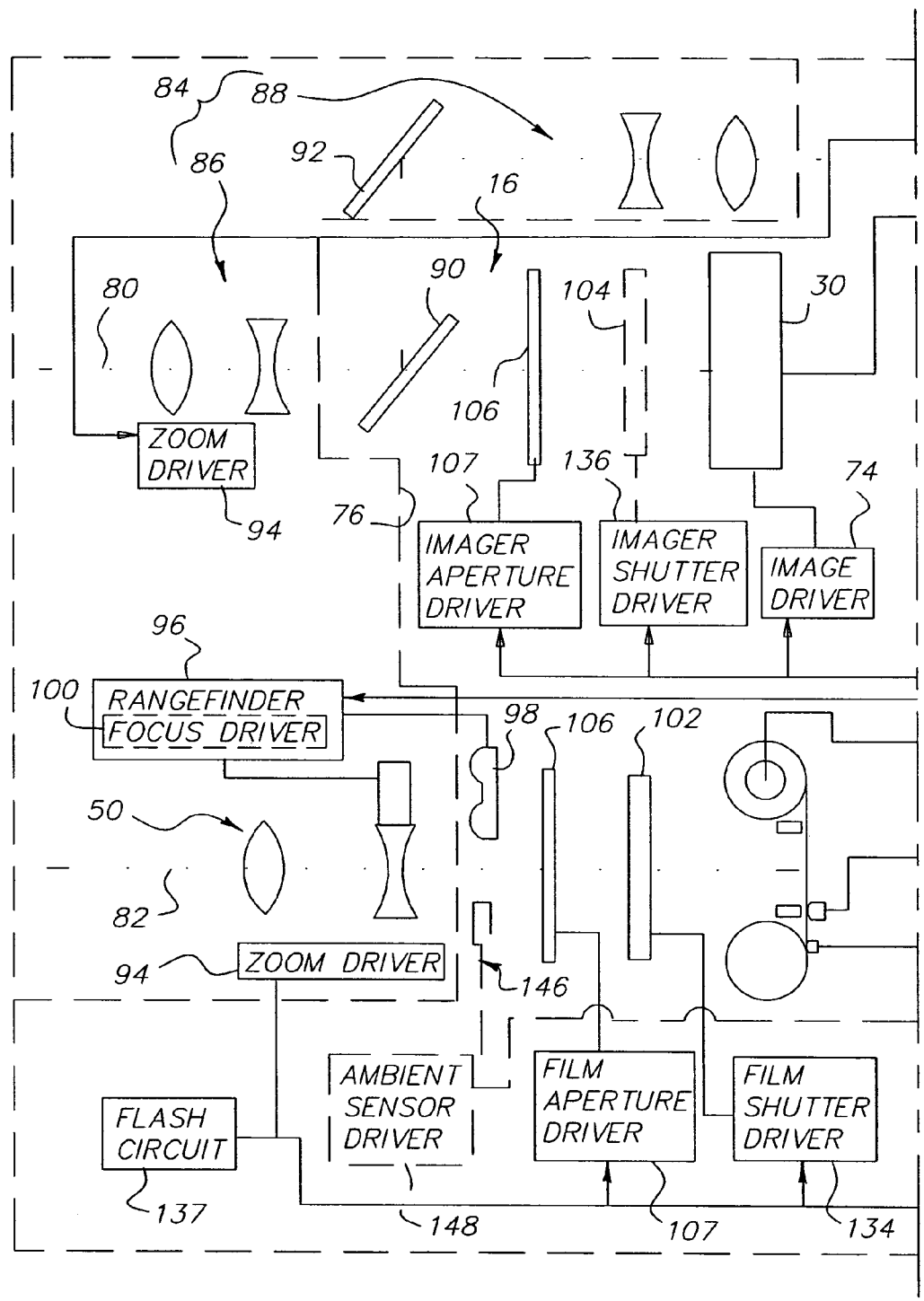
Figure 2B:
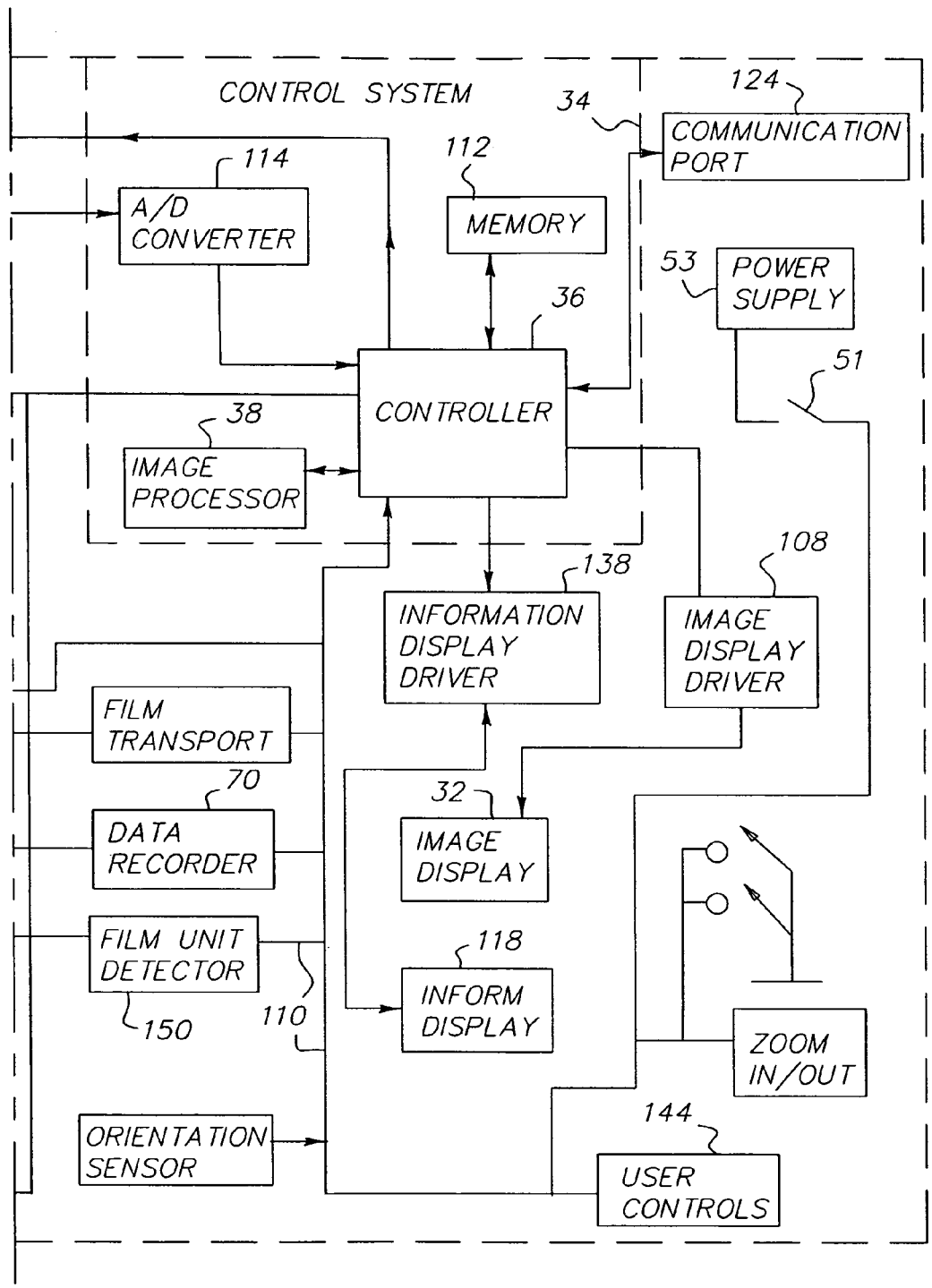

Referring now primarily to FIG. 2, the camera 10 has an optical system 76 of one or more lenses mounted in the body 24. The optical system 76 is illustrated by a dashed line and several groups of lens elements. It will be understood that this is illustrative, not limiting. The optical system 76 directs light to the exposure frame 58 and to the electronic array imager 30. The optical system 76 also preferably directs light through an optical viewfinder 78 to the user.

The imager 30 is spaced from the exposure frame 58, thus, the optical system 76 directs light along a first path (indicated by a dotted line 80) to the exposure frame 58 and along a second path (indicated by a dotted line 82) to the electronic array imager 30. Both paths 80,82 converge at a position in front of the camera 10, at the plane of the subject image. In FIG. 2, the optical system 76 has a combined lens unit 84 that includes both an imager lens unit 86 and a viewfinder lens unit 88. The combined lens unit 84 has a partially transmissive mirror 90 that subdivides the second light path 82 between an imager subpath to the imager 30 and a viewfinder subpath that is redirected by a fully reflective mirror 92 and transmitted through an eyepiece to the photographer.

The optical system 76 can be varied. For example, the viewfinder lens unit 88, imager lens unit 86, and a taking lens unit 50 can be fully separate (not shown) or a combined lens unit 84 can include both a taking lens unit 50 and an imager lens unit 86 (not shown). Other alternative optical systems can also be provided.

In most cameras 10, there is a variation between the field of view of the viewfinder 78 and the field of view of the archival image capture unit 14. The scene delineated by the viewfinder 78 is typically 80 to 95 percent of the field of view of the archival image capture unit 14. The difference ensures that everything the photographer sees will be captured in the archival image, albeit with some additional image content at the edges. Cameras 10 are generally described and illustrated herein in terms of viewfinders that have a 100 percent match to the field of view of the archival image capture unit. This is a matter of convenience in describing the invention. The viewfinders 78 of the cameras 10 can be limited to 80 to 95 percent of the field of view of the archival image capture unit 14 without changing the other features described.

Referring again to the embodiment shown in FIG. 2, the taking lens unit 50 is a motorized zoom lens in which a mobile element or elements are driven, relative to a stationary element or elements, by a zoom driver 94. The combined lens unit 84 also has a mobile element or elements, driven, relative to a stationary element or elements, by a zoom driver 94. The different zoom drivers 94 are coupled so as to zoom together, either mechanically (not shown) or by a control system 34 signaling the zoom drivers 94 to move the zoom elements of the units over the same or comparable ranges of focal lengths at the same time.

The control system 34, which includes a controller 36, can take the form of an appropriately configured microcomputer, such as an embedded microprocessor having RAM or other memory for data manipulation and general program execution.

The taking lens unit 50 of the embodiment of FIG. 2 is also autofocusing. An autofocusing system has a rangefinder 96 that includes a sensor 98. The rangefinder 96 operates a focus driver 100, directly or through the control system 34, to move one or more focusable elements (not separately illustrated) of the taking lens unit 50. The rangefinder 96 can be passive or active or a combination of the two.

The taking lens unit 50 can be simple, such as having a single focal length and manual focusing or a fixed focus, but this is not preferred. One or both of the viewfinder lens unit 88 and imager lens unit 86 can have a fixed focal length or one or both can zoom between different focal lengths. Digital zooming (enlargement of a digital image equivalent to optical zooming) can also be used instead of or in combination with optical zooming for the imager 30. The imager 30 and image display 32 can be used as a viewfinder 78 prior to image capture in place of or in combination with the optical viewfinder 78, as is commonly done with digital still cameras 10. This approach is not currently preferred, since battery usage is greatly increased.

Although the camera 10 can be used in other manners, the archival image is intended to provide the basis of the photofinished or other final image desired by the user. The derived images thus do not have to have the same quality as the archival image. As a result, the imager 30 and the portion of the optical system 76 directing light to the imager 30 can be made smaller, simpler, and lighter. For example, the taking lens unit can be focusable and the imager lens unit 86 can have a fixed focus or can focus over a different range or between a smaller number of focus positions.

A film shutter 102 shutters the light path to the exposure frame 58. An imager shutter 104 shutters the light path to the imager 30. Diaphragms/aperture plates 106 operated by aperture drivers 107, can also be provided in both of the paths 80,82. Each of the shutters 102,104 is switchable between an open state and a closed state. The term "shutter" is used in a broad sense to refer to physical and/or logical elements that provide the function of allowing the passage of light along a light path to a filmstrip 20a or imager 30 for image capture and disallowing that passage at other times. "Shutter" is thus inclusive of, but not limited to, mechanical and electromechanical shutters of all types. "Shutter" is not inclusive of film transports and like mechanisms that simply move film or an imager 30 in and out of the light path. "Shutter" is inclusive of computer software and hardware features of electronic array imagers that allow an imaging operation to be started and stopped under control of the camera controller 36.

In currently preferred embodiments, the film shutter 102 is mechanical or electromechanical and the imager shutter 104 is mechanical or electronic. The imager shutter 104 is illustrated by dashed lines to indicate both the position of a mechanical imager shutter and the function of an electronic shutter. When using a CCD, electronic shuttering of the imager 30 can be provided by shifting the accumulated charge under a light shielded register provided at a non-photosensitive region. This may be a full frame as in a frame transfer device CCD or a horizontal line in an interline transfer device CCD. Suitable devices and procedures are well known to those of skill in the art. When using a CID, the charge on each pixel is injected into a substrate at the beginning of the exposure. At the end of the exposure, the charge in each pixel is read. The difficulty encountered here is that the first pixel read has less exposure time than the last pixel read. The amount of difference is the time required to read the entire array. This may or may not be significant depending upon the total exposure time and the maximum time needed to read the entire array.

CMOS imagers are commonly shuttered by a method called a rolling shutter. CMOS imagers using this method are not preferred, since this shutters each individual line to a common shutter time, but the exposure time for each line begins sequentially. This means that even with a short exposure time, moving objects will be distorted. Given horizontal motion, vertical features will image diagonally due to the temporal differences in the line-by-line exposure. Another method for shuttering CMOS imagers is described in U.S. Pat. No. 5,986,297. In this method, called single frame capture mode, all pixels are allowed to integrate charge during the exposure time. At the end of the exposure time, all pixels are simultaneously transferred to the floating diffusion of the device. At this point, sequential read out by lines is possible.

An image display 32 is mounted on the outside of the body 24 and, preferably, faces the rear of the camera 10. The image display 32 is driven by an image display driver 108 and can be turned on to display a verification image to preview what a print or other final image is expected to look like. The image display 32 can be automatically turned off by a timer for battery conservation. Signal lines 110 electronically connect the imager 30 through the control system 34 to the image display 32. The image display 32 produces a light image (also referred to here as a "display image") that is viewed by the user.

The control system 34, as earlier discussed, includes the controller 36 and memory 112 and also includes an analog-digital converter 114 (also referred to herein as a "A/D converter 114") (this term is inclusive of components that also include an analog signal processor and amplifier) and the image processor 38. Other components can also be provided, as discussed below, in detail. Suitable components for the control system 34 are known to those of skill in the art. Modifications of the control system 34 are practical, such as those described elsewhere herein. The controller 36 can be provided as a single component, such as a microcomputer or microprocessor, or as multiple components of equivalent function in distributed locations. The same considerations apply to the processor and other components. Likewise, components illustrated as separate units herein may be conveniently combined or shared in some embodiments. Hardware and software provided by the controller or control system that controls reading from and writing to memory is also referred to herein as a "memory writer".

The captured analog electronic image is amplified and converted by the A/D converter 114 to a digital electronic image, which is then processed in the image processor 38 and stored in the memory 112.

"Memory" refers to one or more suitably sized logical units of physical memory provided in semiconductor memory or magnetic memory, or the like. For example, the memory can be an internal memory, such as a Flash EPROM memory, or alternately a removable memory, such as a CompactFlash card, or a combination of both. "Memory 112", as used herein, is separate from the "film unit 18". Thus, in some embodiments, the camera has both memory 112 and a digital film unit 18.

It is currently preferred that the signal lines 110 act as a data bus connecting the imager 30, controller 36, processor 38, the image display 32, and other electronic components.

The controller 36 and image processor 38 can be controlled by software stored in the same physical memory 112 that is used for image storage, but it is preferred that the processor 38 and controller 36 are controlled by firmware stored in dedicated memory (not separately illustrated), for example, in a ROM or EPROM firmware memory. Separate dedicated units of memory can also be provided to support other functions.

The respective electronic images correspond to the latent images on the exposed film frames 28, and, after processing, are individually stored in memory 112, each time the filmstrip 20a is advanced forward one frame increment following a film exposure. The memory 112 has a successive-image storage capacity for a limited number of electronic images. For convenience, the electronic images stored in a single camera 10 are generally treated herein as all being of the same size or about the same size. This is the case in currently preferred embodiments; but is not limiting.

Figure 21:
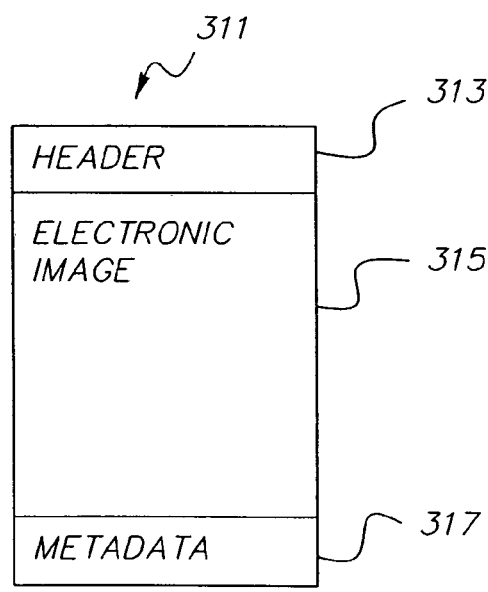
FIG. 21 is a diagrammatical view of an image file that includes an electronic image and respective metadata.

Electronic images can be stored in memory as image files. The terms "image file", "memory file", and "file", as used herein, refer to a logical portion of memory that holds information, such as image data or image data and metadata, and is handled within memory as a single unit. For example, a file can be erased as a whole, but cannot be partially erased. "Files" in personal computer and the like function in the same manner and other features of such systems are also comparable. For example, in personal computers having a Microsoft Windows 98 or Windows NT operating system, memory files are erased by changing the filename of the file in a file allocation table to the memory. The change in the filename, by replacing a first character of the filename with a special designation, moves the physical memory associated with the file to a FIFO overwriting queue. The file is overwritten in due course. Before it is overwritten, the erasing of the file is reversible by reassignment of a complete filename to the file. The overwriting results in replacement of all or part of the information within what had been the file with other information and, absent extraordinary measures, the earlier information is irretrievable. Image files discussed herein have the characteristics of one of the various types of files used for a similar purpose in memories of personal computers and other larger computers. An example of such a file is shown in FIG. 21. The file shown has a header and the data for a particular image. The file can be defined by fixed unit of physical or logical space within memory or can be defined by a file allocation table or the like.

The capacity of the memory can be defined artificially as a fraction of the total memory of the camera. This approach may be needed for memory 112 that is shared with other components. The capacity of the memory 112 is divisible, for purposes of analysis into unit spaces or subdivisions of the memory that can each hold a single electronic image captured by the camera. This analysis provides an integer value, in electronic image spaces, of the capacity. If all electronic images captured by the camera are of the same size, either initially or after a standardized compression procedure, then the capacity of the memory is simply a matter of dividing the physical capacity of the memory by the unit size of the electronic images. This calculation can be done ahead or provided as needed by the controller.

If electronic images stored by the camera are not necessarily of the same size, either due to differences in the effect of compression or for other reasons, then the camera can still make the same calculation; but the calculation must be based upon a nominal size electronic image. To save processing, it is preferred that this nominal size electronic image be predefined rather than being estimated on the basis of earlier captured images. Any portion of memory attributable to the remainder of the analytical division used to determine the integer capacity, can provide a small reserve to accommodate one or more stored images of slightly excessive size. If wide variation in stored image sizes or other increase memory demand is expected, then the reserve can be increased in size by decreasing the capacity by one or more units.

The capacity of the memory can be set to an integer number of electronic image units that represent an arbitrary fraction of the total memory of the camera. This can be done by the controller and is useful, for example, if the physical memory 112 is removable and replaceable by another memory component of different capacity. (The memory 112 and the digital film unit 18 can share the same component; but are distinguished on the basis of the nature of the images stored and the use to which those images are put. The use of a removable component for memory 112 adds unnecessary complexity and for that reason is not preferred.)

It is preferred that the capacity of the memory is sufficient to hold an electronic image corresponding to each latent image on an expected film unit. For APS film, expected film units have 15, 25, or 40 film frames and the preferred memory capacity is sufficient to hold more than 40 electronic images. An excess of capacity beyond that needed to hold electronic images corresponding to the highest expected number of film images is even more preferred, since this allows the storage of electronic images for an entire film unit plus some number of electronic-only images.

The embodiment shown in the figures has space for storing up to 50 captured electronic images. This number exceeds the maximum number of latent images on currently available APS film units, which is 40. When a latent image is exposed, the filmstrip 20a is advanced a frame increment. This is detected by one or more sensors 116 which signal the controller. In response, the controller 36 decrements a frame count (the number of film frames 28 available on the filmstrip 20a that remain to be exposed) stored in memory 112 by one. The frame count can go forward from zero or backward from 15, 25, or 40 depending on whether the filmstrip 20a has a 15-exposure, 25-exposure, or 40-exposure length. The current frame count is shown in an information display 118. In the camera shown in FIGS. 3–4, a pair of identical film perforation sensors 116 for sensing successive pairs of film perforations 120 in the filmstrip 20a are mounted in respective pockets in the film pressure platen 72 and are connected to the controller.

The manner in which electronic images are stored in memory 112 is not critical. For convenience, the storing of electronic images is discussed herein in terms of allocated separate single-image addresses or blocks "1" to "50" in the memory 112. Consistent with the frame count, respective frame numbers for the captured electronic images are stored at the single-image addresses " 1" to "50" in the memory 112. The respective electronic images stored in the memory 112 at the single-image addresses can be accessed separately and shown individually on the image display 32.

In preferred embodiments, image metadata, including such information as the selected print title, print exposure correction, print format and print quantity for every one of the exposed film frames is stored in memory 112. This storage in memory can take the place of recording the image metadata in the film unit, until all the film frames have been exposed or can be in addition to intermittent recording in the film units during exposure of the film frames. In either case, the provision of the image metadata in memory 112 allows quick access to the information. This is particularly advantageous with APS type film units that record image metadata in a magnetic layer of the filmstrip, since the filmstrip must otherwise be transported past the reader-writer to access such magnetically recorded information. This is slow and increases energy consumption by the camera.

The image metadata is recorded in memory as corresponding designations or assignments for the respective film frames and in association with the captured electronic images stored in the memory. In practice, image metadata for the most-recently exposed one of the film frames is stored in the memory, along with the corresponding electronic image each time the filmstrip is advanced one frame increment following a film exposure.

The camera 10 has a communications port 124, through which the electronic images stored in memory 112 can be downloaded under the control of the controller 36 to a image manipulation device 126 (illustrated as a computer, and only in FIG. 1) such as a computer or network or digital appliance, using a communications protocol, such as the USB protocol. The image manipulation device includes a computer monitor that allows the downloaded images to be visualized and also includes software and hardware necessary to manipulate the downloaded images in some manner, such as digital editing, or printing, or photofinishing or the like.

The camera 10 can optionally provide for downloading of individual electronic images; however, it is currently preferred that all images in memory be downloaded at each download event. The reason this approach is preferred, is that, in preferred embodiments, the size of the electronic images is relatively small and download times are relatively quick; and, with this in mind, it is better for the user to download all images, then discard any that are not desired, rather than present the risk that wanted images will not be downloaded or increase the time necessary to download images by increasing the number of steps required.

The controller 36 facilitates the transfers of the image, along the signal lines 110, between the electronic components and provides other control functions, as necessary. The controller 36 includes a timing generation circuit that produces control signals for all electronic components in timing relationship.

Calibration values for the individual camera 10 are stored in a calibration memory (not separately illustrated), such as an EEPROM, and supplied to the controller 36. The controller 36 operates the memory 112 or memories and the drivers including the zoom drivers 94, focus driver 100, imager driver 74, that mediates flash functions.

It will be understood that the circuits shown and described can be modified in a variety of ways well known to those of skill in the art. It will also be understood that the various features described herein terms of physical circuits can be alternatively provided as firmware or software functions or a combination of the two. The controller 36 is illustrated as a single component, but it will be understood that this is a matter of convenience in illustration. The controller 36 can be provided as multiple components of equivalent function in distributed locations. The same considerations apply to the processor 38 and other components. Likewise, components illustrated as separate units herein may be conveniently combined or shared in some embodiments.

The digital electronic image stored in memory 112, is accessed by the processor 38 and is modified so as to provide a required derived image. As a part of showing a derived image on the image display 32, the camera 10 may modify the derived image for calibration to the characteristics of the particular display. For example, a transform can be provided that modifies each image to accommodate the different capabilities in terms of gray scale, color gamut, and white point of the display and the imager and other components of the electronic capture unit. It is preferred that the display is selected so as to permit the entire verification image to be shown; however, more limited displays can be used. In the latter case, the displaying of the verification image includes calibration that cuts out part of the image, or contrast levels, or some other part of the information in the verification image.

The derived images can also be modified in the same manner that images are enhanced in filly digital cameras. For example, processing can provide interpolation and edge enhancement. A limitation here is that the derived images are intended to correspond to photofinished archival images and, thus, enhancements should be limited so as to not render the derived image dissimilar to the corresponding photofinished archival image. If the archival image is an electronic image, then comparable enhancements can be provided for both verification and archival images. Digital processing of an electronic archival image can also include modifications related to file transfer, such as, JPEG compression, and file formatting.

Enhancements can be provided to match the calibrated derived image to output characteristics of a selected photofinishing channel. Photofinishing related adjustments assume foreknowledge of the photofinishing procedures that will be followed for a particular unit of capture media. This foreknowledge can be made available by limiting photofinishing options for a particular capture media unit or by standardizing all available photofinishing or by requiring the user to select a photofinishing choice, for example by entering a character on a control pad or setting a switch. This designation can then direct the usage of particular photofinishing options and can provide for a direct or indirect indication of the effect in a derived image. The application of a designation on a capture media unit could be provided by a number of means known to those in the art, such as application of a magnetic or optical code.

Derived images can be prepared from the electronic image before being needed or as needed, as desired, subject to the limitations of processing speed and available memory. To minimize the size of the memory 112, an electronic image can be processed and stored as a lower resolution image, before a succeeding image is read out from the imager 30.

Different types of image display 32 can be used. For example, the image display 32 can be a liquid crystal display ("LCD"), a cathode ray tube display, or an organic electroluminescent display ("OELD"; also referred to as an organic light emitting display, "OLED").

The image display 32 is preferably mounted on the back or top of the body 24, so as to be readily viewable by the photographer immediately following a picture taking. One or more information displays 118 can be provided on the body 24, to present camera information to the photographer, such as exposures remaining, battery state, and flash state.

For convenience, the information display 118 is generally discussed here in the singular. The information display 118 and image display 32 can be provided by separate display devices or both can be provided by contiguous parts of a common display device. The information display 118 can be deleted if information is instead provided on the image display 32 as a superimposition on the image or alternately instead of the image (not illustrated). If separate, the information display 118 is operated by an information display driver 138.

Information can be provided on one or both of the image and information displays 32,118. It is preferred, that information relating to image capture be shown on the information display only, so that the image display 32 can be turned off during the process of image capture. With currently available displays, this results in considerable energy savings.

In the embodiment shown in FIGS. 3–4, the image display 32 is mounted to the back of the body 24 and the information display 118 is mounted to the body 24 adjacent to the image display 32 such that the two displays 32,118 form part of a single user interface 140 that can be viewed by the photographer in a single glance. The image display 32 and an information display 118 can be mounted instead or additionally so as to be viewable through the viewfinder 78 as a virtual display (not shown).

It is preferred that the image display 32 is operated on demand by actuation of a switch (not separately illustrated) and that the image display 32 is turned off by a timer or by initial depression of the shutter release 26. The timer can be provided as a function of the controller 36. When the image display 32 is activated, earlier captured images can be reviewed using the appropriate user control 144.

Image metadata is made available to the user while respective images are shown on the image display. The image metadata can be shown on the image display or information display or on both, in some combination. As with other information discussed herein, the image metadata can be presented in alphanumeric form or as icons.

Referring now particularly to FIGS. 3–4, the user interface 140 of the camera 10 includes the shutter release 26, the "zoom in/out" toggle 142 that controls the zooming of the lens units, and other user controls 144 along with the image display 32 and the information display 118. The shutter release 26 operates both shutters 102,104. To take a picture, the shutter release 26 is actuated by the user and trips from a set state to an intermediate state, and then to a released state. The shutter release 26 is typically actuated by pushing, and, for convenience the shutter release 26 is generally described herein in relation to a shutter button that is initially depressed through a "first stroke", to actuate a first switch S1 and alter the shutter release 26 from the set state to the intermediate state and is further depressed through a "second stroke", to actuate a second switch S2 and alter the shutter release 26 from the intermediate state to the released state. Like other two stroke shutter releases well known in the art, the first stroke actuates exposure-delimiting camera components, such as autofocus, autoexposure, and flash unit readying; and the second stroke actuates capture of the archival image.

Referring now to FIG. 2, when the shutter release 26 is pressed to the first stroke, the taking lens unit 50 and combined lens unit 84 are each autofocused to a detected subject distance based on subject distance data sent by the rangefinder 96 to the controller 36. The controller 36 also receives data indicating what focal length the lens units 50,84 are set at from one or both of the zoom drivers or a zoom sensor (not shown). The camera 10 also detects the film speed of the film cartridge 18a loaded into the camera 10 using the IX reader and relays this information to the controller 36. The camera 10 obtains scene brightness (Bv) from components, discussed below, that function as a light meter. The scene brightness and other exposure parameters are provided to an algorithm in the controller 36, which determines a focused distance, shutter speeds, apertures, and optionally a gain setting for amplification of the analog signal provided by the imager 30. Appropriate signals for these values are sent to the drivers via a motor driver interface (not shown) of the controller 36. The gain setting is sent to the A/D converter 114.

The camera 10 assesses ambient lighting using the imager 30 or a separate detector 146 (indicated by dashed lines in FIG. 2) or both. The detector 146 has an ambient detector driver 148 that operates a single sensor or multiple sensors (not shown). In some embodiments, the evaluation image capture unit 16 is used to assess ambient lighting. In those embodiments, one or more electronic images are captured prior to capture of the archival image. The captured electronic image data from one or more of these preliminary images is sampled and scene parameters, such as automatic setting of shutter speeds and diaphragm settings, are determined from that data. These preliminary electronic images can be captured in a continuing sequence as long as the capture system is in a preliminary mode. For example, preliminary images can be captured seratim, as long as the shutter release 26 is actuated through the first stroke and is maintained in that position. This capture of preliminary images ends when the shutter release 26 is returned to a stand-by position or is actuated through the second stroke for archival image capture. The preliminary electronic images could be saved to memory 112; but, except as otherwise described here, are ordinarily discarded, one after another, when the replacement electronic image is captured to reduce memory usage. The preliminary images can also be provided to the image display 32 for use by the photographer, prior to picture taking, in composing the picture. This use of the image display 32 as an electronic viewfinder 78 greatly increases energy usage and is not preferred for that reason.

The electronic capture unit is calibrated during assembly, to provide measures of illumination, using known values. For example, the controller 36 can process the data presented in a preliminary image using the same kinds of light metering algorithms as are used for multiple spot light meters. The procedure is repeated for each succeeding preliminary image. Individual pixels or groups of pixels take the place of the individual sensors used in the multiple spot light meters. For example, the controller 36 can determine a peak illumination intensity for the image by comparing pixel to pixel until a maximum is found. Similarly, the controller 36 can determine an overall intensity that is an arithmetic average of all of the pixels of the image. Many of the metering algorithms provide an average or integrated value over only a selected area of the imager array 30, such as an upper middle region. Another approach is to evaluate multiple areas and weigh the areas differently to provide an overall value. For example, in a center-weighted system, center pixels are weighted more than peripheral pixels. The camera 10 can provide manual switching between different approaches, such as center weighted and spot metering. The camera 10 can, alternatively, automatically choose a metering approach based on an evaluation of scene content. For example, an image having a broad horizontal bright area at the top can be interpreted as sky and given a particular weight relative to the remainder of the image.

Under moderate lighting conditions the imager 30 can provide light metering and color balance determination from a single preliminary image. More extreme lighting conditions can be accommodated by use of more than one member of the series of preliminary electronic images while varying exposure parameters until an acceptable electronic image has been captured. The manner in which the parameters are varied is not critical.

After the controller 36 receives the scene brightness value, the controller 36 compares scene brightness to a flash trip point. If the light level is lower than the flash trip point, then the controller 36 enables full illumination by the flash unit 48, unless the user manually turned the flash off. Appropriate algorithms and features for these approaches are well known to those of skill in the art.

A second switch S2 actuates when the shutter release 26 is further pushed to a second stroke. When the second switch S2 actuates, the film shutter 102 is tripped and the capture of the latent image exposure on the film frame 28 begins. The film shutter 102 momentarily opens for a duration referred to herein as a "archival image exposure time interval". The imager shutter 104 is also actuated and momentarily opens during the archival image exposure time interval to capture the initial electronic image.

When a film unit 18 is to be removed from the camera 10, the film door 46 is opened and the film unit 18 is extracted. The camera 10 has a film unit detector or signaler 150, which switches between a film present or loaded state and a film absent or unloaded state. The different states correlate with the load status of the film holder. The film unit detector 150 can be configured to also act as the IX reader, earlier discussed.

The signaler 150 send signals to the controller, which keep the controller current as to the film holder load status. The film removal signal can be provided in response to any of the events that occur after all the frames have been exposed on a film unit and the film unit is unloaded from the camera. For example, the film removal signal can be provided upon automatic rewinding following last exposure or upon opening of the film door. In a particular embodiment, the film removal signal is responsive to a combination of the film door opening and, in sequence, the detection of the film unit in the film space followed by nondetection of the film unit. The film unit detector 150 can also send a film loading signal to the controller 36 when a film unit 18 is loaded, in the same manner. For example, the film loading signal can be sent when a film unit 18 has been placed in the film space and the film door 46 has been closed. In response to the film removal and film loading signals, the controller 36 can cause the information display 118 to show icons or other indicia (not illustrated) that indicate whether or not a film unit 18 is loaded and the film door is shut.

A wide variety of film unit detectors 150 are known in the art. The simplest is a switch (not shown) having a throw that is tripped by physical interference with the film unit when the film unit is loaded into the camera. Another example is an optical detector that is actuated by the presence or absence of a reflected beam from the film unit. The signaler 150 can be a single component or, alternatively, can include a film unit presence sensor and a separate film door sensor (not shown), to provide separate indications of film unit presence and film door state. The manner of operation of the sensor or sensors of the signaler is not critical. For example, a sensor can be a mechanical switch having a contact arm biased against the film unit. When the film unit is removed, the contact arm moves into the emptied space and changes a state of the switch. Likewise, a sensor can be an infrared light-emitting diode-light detector pair positioned such that a signal is interrupted by the film unit.

The image display 32 can be used to verify the quality of a just captured image and can also be used to review earlier captured images. While reviewing an electronic image, the user can edit one or more features of a final image that will be produced by photofinishing. This is done by changing one or more editing parameters that are recorded on the film units and in memory as metadata. The user can also review other metadata that is not editable, such as date and time of image capture.

It is preferred that the camera memory 112 has sufficient capacity to store an electronic image corresponding to each of the film frames 28 of the film unit 18, since this allows the user to review all of the images of a film unit 18 at one time. Since the film units 18 come in different capacities, the memory 112 needs sufficient capacity to store an electronic image corresponding to each of the film frames 28 of a film unit 18 having the largest capacity. This provides excess capacity in memory 112 when smaller capacity film units 18 are used. It is preferred that the memory 112 of the camera 10 has sufficient capacity to provide some excess over even the largest capacity film unit 18.

The excess memory capacity can be used to allow the user to review electronic images corresponding to archival images of earlier used film units 18. The captured electronic images corresponding to the latent images in the film units 18 are not erased from memory 112 when the respective film unit 18 is removed from the camera 10; instead, once the memory 112 is full, the oldest captured electronic image is overwritten by the newest captured electronic image. (If necessary, two old electronic images may be deleted if required to free enough memory 112 to store one new image). The order in which the images are replaced, in a first in-first-out queue, corresponds to many practices in inventory control and the like and is also referred to herein by the term "FIFO". The hardware and software of the controller or control system that controls the FIFO queue is also referred to herein as the "assignment unit".

Since the memory 112 is large enough to hold electronic images from more than one roll of film, the memory 112 therefore holds at least two types of electronic images: current electronic images corresponding to the latent images on the exposed frames 28 of the film unit 18 currently loaded in the camera 10, and electronic images corresponding to the latent images on the exposed frames 28 of one or more film units 18 earlier exposed in the camera 10. By storing both current images and past images, the user can view or download a last series of electronic images, within the limits of storage capacity, even if they removed a first film unit and started a second film unit. The memory 112 can also store electronic-only images which have no corresponding latent image.

User controls 144 are provided for reviewing, editing and other functions. The controller can provide a changeable set of user controls by redefining buttons or the like and providing explanatory indicia on one or both displays. Access to the different control sets described herein can be provided automatically as needed, or can be cycled through as applicable, by actuating a designated control feature, such as the Edit button or a combination of buttons.

Some features of final images produced from the archival images can be modified while the verification images are viewed. User controls are provided to allow for modification of the image metadata associated with the electronic image displayed on the image display and the corresponding film image. The user controls signal to the controller user choices of metadata for a particular image. Other features determine non-user selectable metadata. For example, date and time are provided by a clock. Like the clock, the hardware and software that responsively generates the metadata can be provided as a part of the controller or by multiple components of the control system. This hardware and software is also referred to herein by the term "designator".

It is preferred, that the image display show the electronic image in modified form when a change is made in the corresponding image metadata. For example, if the user changes the print format metadata for a particular electronic image-film image pair from "H" to "P"; it is preferred that the displayed image be changed by cropping to show only the portions which will be presented in the printed final image in the "P" print format. The controller can provide these functions using algorithms well known to those of skill in the art.

Figure 5:
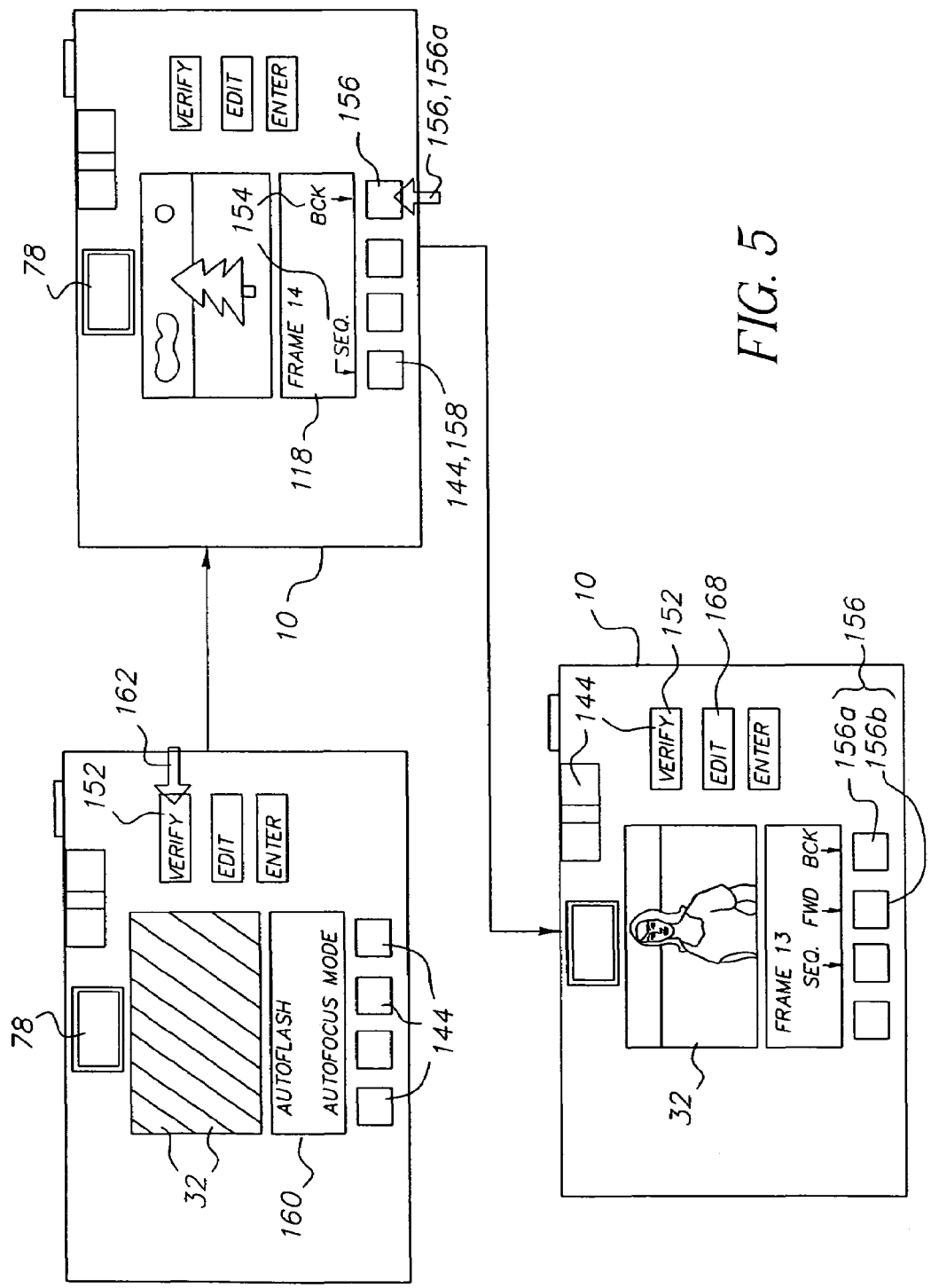
FIG. 5 is a diagrammatical view of a procedure for sequencing through images captured using the camera of FIG. 2. Cross-hatching is used in drawings of the image display to indicate an area in which no image is shown.
Figure 6:
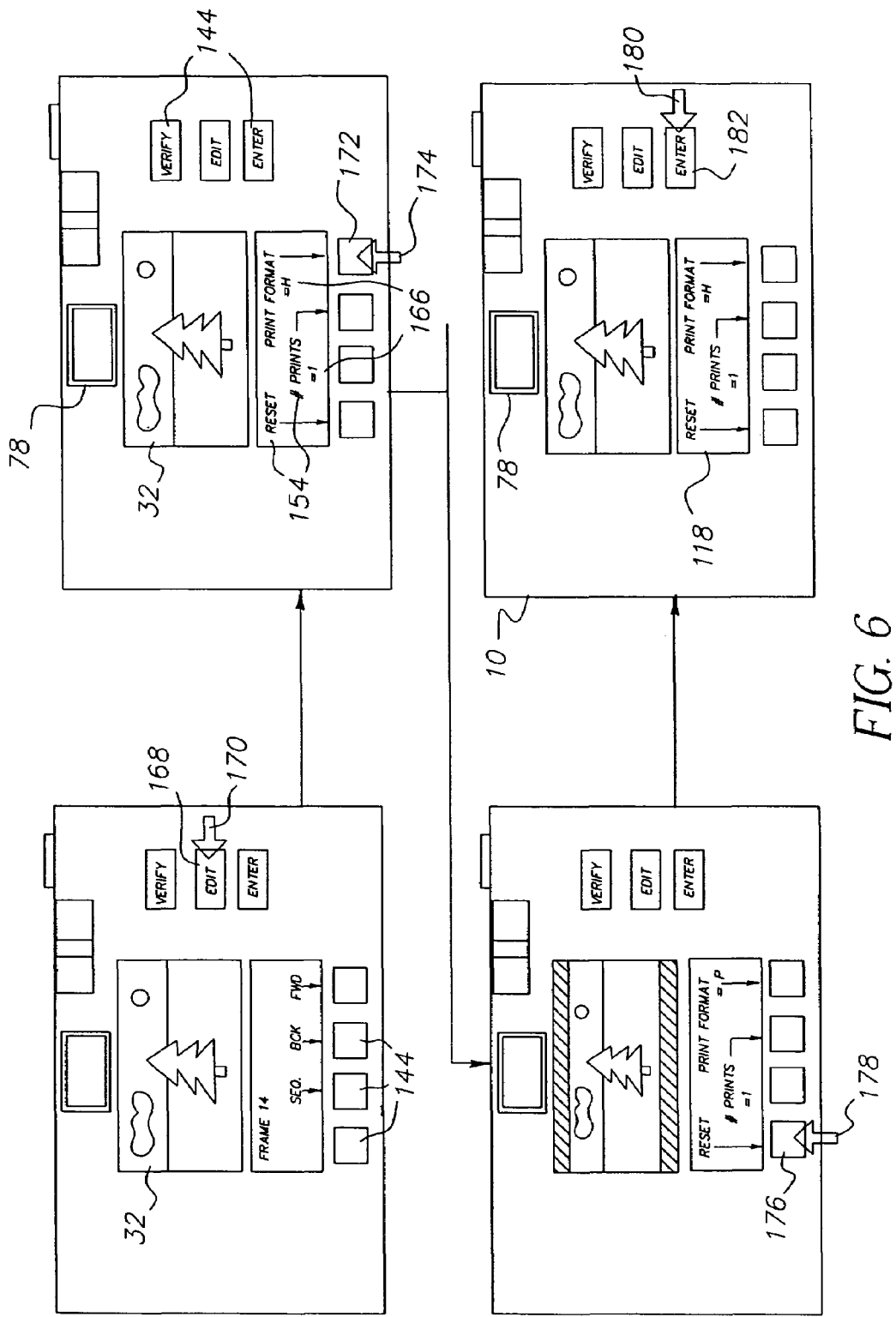
FIG. 6 is a diagrammatical view of a procedure of editing images captured using the camera of FIG. 2.

Referring now to FIGS. 5–6, editing follows image capture and begins with the user pressing the verify button 152 of the user interface 140 to access a verification image. The verify button 152 acts like a normally open switch connecting the image display 32 to the controller 36. Pressing the verify button 152 turns the image display 32 on when it is off and off when it is on. Responsive to activation, the controller 36 causes an image to be shown on the display 32. The controller also disables image capture while the image display 32 is activated.

The specific image initially shown is discussed below in detail. The following discussion is in relation to an embodiment illustrated by FIG. 5, in which the image initially shown is the last captured archival image. Like considerations apply when a different image is initially shown. In FIG. 5, the user can change from the last captured image to earlier captured images by moving an image selector 156. This is illustrated as one or more user controls 144 that are software defined to provide the required function. The information display 118 explains the function with appropriate captions 154. The image selector can also be provided by a dedicated single-function user control (not illustrated) or can be provided by a software defined user control that does not utilize the information display. An example of the latter is using the zoom toggle 142 to cycle forward or backward during review of images in memory.

The camera 10 is initially in an image capture state and the information display bears capture related information 160. The examples of this information, shown in FIG. 5, are operational modes for the capture system and flash and the number of the next film frame. The image display 32 is activated by the user pressing (indicated by arrow 162) the verify button 152 and an earlier image is selected by the user pressing a backward direction button 156a (labelled "Bck") of the image selector 156. A forward direction button 156b (labelled "Fwd") is also provided, as a part of the image selector 156, when appropriate.

In a particular embodiment of the camera, the controller turns the image display on automatically (without having to manually depress the verify button) when an electronic image corresponding to the last film image available on the filmstrip is captured and, after a short delay turns the image display off and automatically starts film rewind. The verify button can be disabled during display of the last image, so the user is not confused as to the cause of the film rewinding. The camera can, alternatively, wait to rewind until the image display is turned off manually or automatically, following last image capture.

The images shown on the display 32 can sequence through automatically, in the form of a slide show, but this is not preferred for editing. What is preferred, is that a separate actuation of the image selector 156 be required to sequence from one electronic image to the next. FIG. 5 illustrates this procedure.

The review of earlier images provided by the camera 10 can be limited to chronological review or can be variable to allow review of all images or sets of images in different orders. The specific sequence followed is not critical and different sequences can optionally be provided by changing a sequence control 158 ("Seq" in FIGS. 5–6). It is currently preferred that the sequence in which the images are shown is chronological from newest to oldest. Other sequences, such as discussed in U.S. Pat. No. 5,978,016, or oldest to newest, or ordering on the basis of editing parameters and then chronology, can also be used. For example, the sequence can be in order of selected print formats and chronologically within each format. Electronic-only images can be displayed in sequence with electronic images having corresponding latent images, or can be displayed in a separate sequence, as desired.

During editing, the display 32 indicates specific changes selected by the user and can also indicate values 166 for one or more of the various editing parameters. For example, numbers of prints and format and any explanatory captions can be indicated in alphanumeric form on the information display, as shown in FIG. 6. It is preferred, that when practical, the image display present the selected changes as modifications of the displayed electronic image rather than simply by a designation. For example, in FIG. 6, the print format of the image is cropped to indicate a change to "P" from "H" and the print format is also indicated by an optional textual message. For electronic images not associated with film loaded in the camera 10, there can be provided an indicia (not shown) on the image display showing that the respective image is not from the current roll and APS photofinishing related features, such as print quantity, are no longer subject to change.

Changes shown on the display, can be made on the stored electronic image in memory, but it is preferred that changes be made on a "cloned image", that is, a derived copy of the electronic image in memory. This provides better protection against user mistakes, since the user can back up to the image stored in memory without fear of irretrievable damage.

In the embodiment shown in FIG. 6, to edit, the Edit button 168 is pressed (indicated by arrow 170) and a format designator 172 is then pressed (indicated by arrow 174). A reset button 176 is then pressed (indicated by arrow 178) to go back to the image as it existed before the editing session shown in FIG. 6. This approach has additional advantages, since multiple cloned images can be generated and discarded as needed or before. This allows the user to rapidly switch back and forth between different editorial changes to see the effects of those changes.

When the user is satisfied with one or more editorial changes in the editing parameters, the user permanently records those changes in association with the respective archival images. In the embodiment shown in FIG. 6, the user presses (indicated by arrow 180) the Enter button 182. This causes film to be rewound and then moved past a data recorder 184 (also referred to as a film writer/reader 184), such as a magnetic read/write head (shown in FIGS. 1, 2, and 4) as required to rewrite the metadata for respective film frames to incorporate changes. Alternatively, the information is stored in memory 112, for later writing to the film in a similar manner, before the film unit is removed from the camera. A comparable procedure is followed for electronic archival images.

Figure 7A:
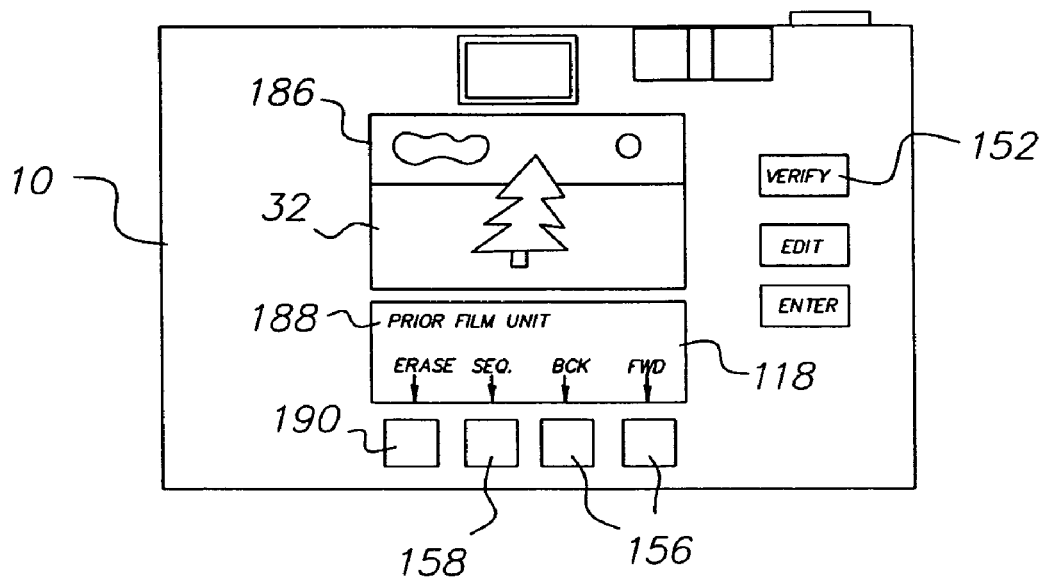
FIG. 7a is a diagrammatical view of the display of an electronic-only image in the camera of FIG. 2.

FIG. 7 illustrates the display of an electronic-only image 186 in a camera 10 that captures electronic-film image pairs. The electronic image is displayed on the image display 32 and corresponding information is shown on the information display 118. A message 188, on the information display 118, indicates that the image shown is from a prior film unit. An image selector 156 and sequence control 158 are provided which allow the user to go forward or back through the sequence of images in memory. An erase control 190 is provided to erase the electronic-only image, if desired. In the embodiment shown, the erase control 190 is provided by a software modified user control 144, but other types of user control 144 could be used instead, in the same manner as earlier discussed.

The sequence, back, and forward user controls 158,156a, 156b operate in the same manner as earlier discussed for the electronic image corresponding to a film frame of the film unit in the camera. The erase user control 190 is only provided for electronic images that do not have a corresponding film frame in a film unit loaded within the camera. Pressing the erase button 190 erases from memory 112 the electronic image shown on the display 32 and its corresponding metadata. The erasure can be reversible or irreversible, depending upon the camera embodiment. Features related to film unit detection, electronic image erasure, and other handling of electronic images are discussed below, in detail.

Figure 7B:
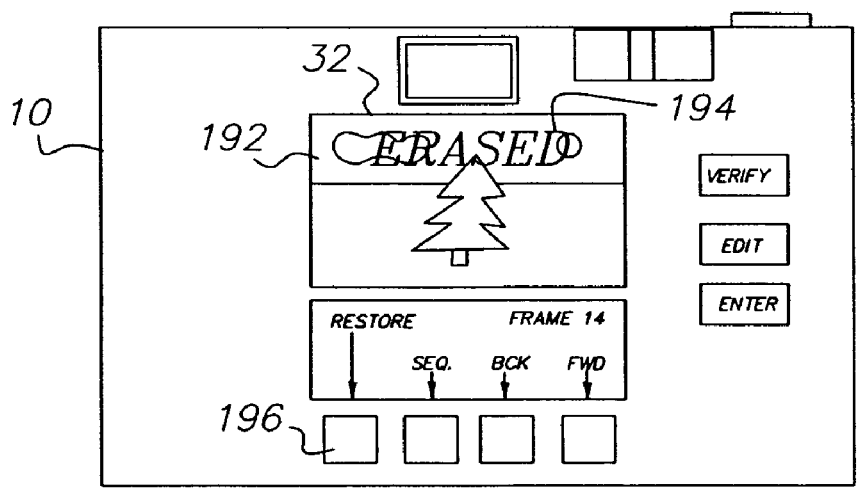
FIG. 7b is a diagrammatical view of the display of a reversibly erased electronic image in the camera of FIG. 2.

Reversible erasure moves the electronic image and metadata to the FIFO overwriting queue, and, if desired, can advance the particular electronic image and metadata to the head of that queue. Referring to FIG. 7b, in a particular embodiment, erasure is reversible. Erased, but not yet overwritten, electronic images can be viewed by the user. An erased image 192 is shown with a status indicia 194 (in FIG. 7b, the word "ERASED") that informs the user that the electronic image shown has been reversibly erased. The controller 36 can provide a restore control 196 to unerase the respective electronic image and metadata while the image and metadata are not yet overwritten. This feature can be provided for all images, but it is currently preferred that electronic-only image be irreversibly erased so as to not be recoverable by the user.

Revision of Stored Metadata at Film Unit Removal

As earlier discussed, when a user views electronic images corresponding to film images of a film unit that has been removed from the camera, not all editorial functions are available. The controller does not provide or locks out user controls that would otherwise allow the user to change metadata that relates to photofinishing of the removed film unit, because that information along with the rest of the image metadata has already been written to the film unit and the film unit is inaccessible by the camera. For example, the user cannot change the number of prints ordered. This type of metadata that relates only to photofinishing (also referred to herein as "photofinishing metadata"), can be retained in the camera with electronic images after removal of the respective film unit, but is of little value to the user. Even if the removed film unit could be reloaded, it is expected that there would be little demand for a capability of changing photofinishing metadata, particularly since earlier electronic images may not be available for viewing as a result of electronic image overwriting during continuing image capture.

Photofinishing metadata is distinguished from other metadata that is also referred to herein as "image metadata". Photofinishing metadata relates only to the final images produced by photofinishing, while image metadata relates to a characteristic of both the final image and the electronic image in the memory of the camera. For example, date and time of capture of an image and geometric format are all image metadata.

The term "geometric format" is used here to refer to an original image size and shape and alternatives derived from that image by cropping, with or without subsequent enlargement of the cropped image. "Geometric format" is thus inclusive of changes in aspect ratio, such as print formats "H", "C", and "P" provided by APS film units. "Geometric format" is also inclusive of other cropping, whether in a standardized or individually selected manner. For example, without changing aspect ratio, images can be cropped and enlarged (zoomed in) or cropped and rotated. Geometric formats available in a particular use are subject to applicable standards and practical limitations, particularly with the use of photographic film as archival media. Non-standardized cropping of individual images can be practical if the film unit uses digital storage media instead of photographic film. For convenience, in the following discussion, the features here are generally discussed in terms of changes in aspect ratios based on APS film units. Other film units are utilized, with similar or different types of cropping, in a like manner.

Figure 8:
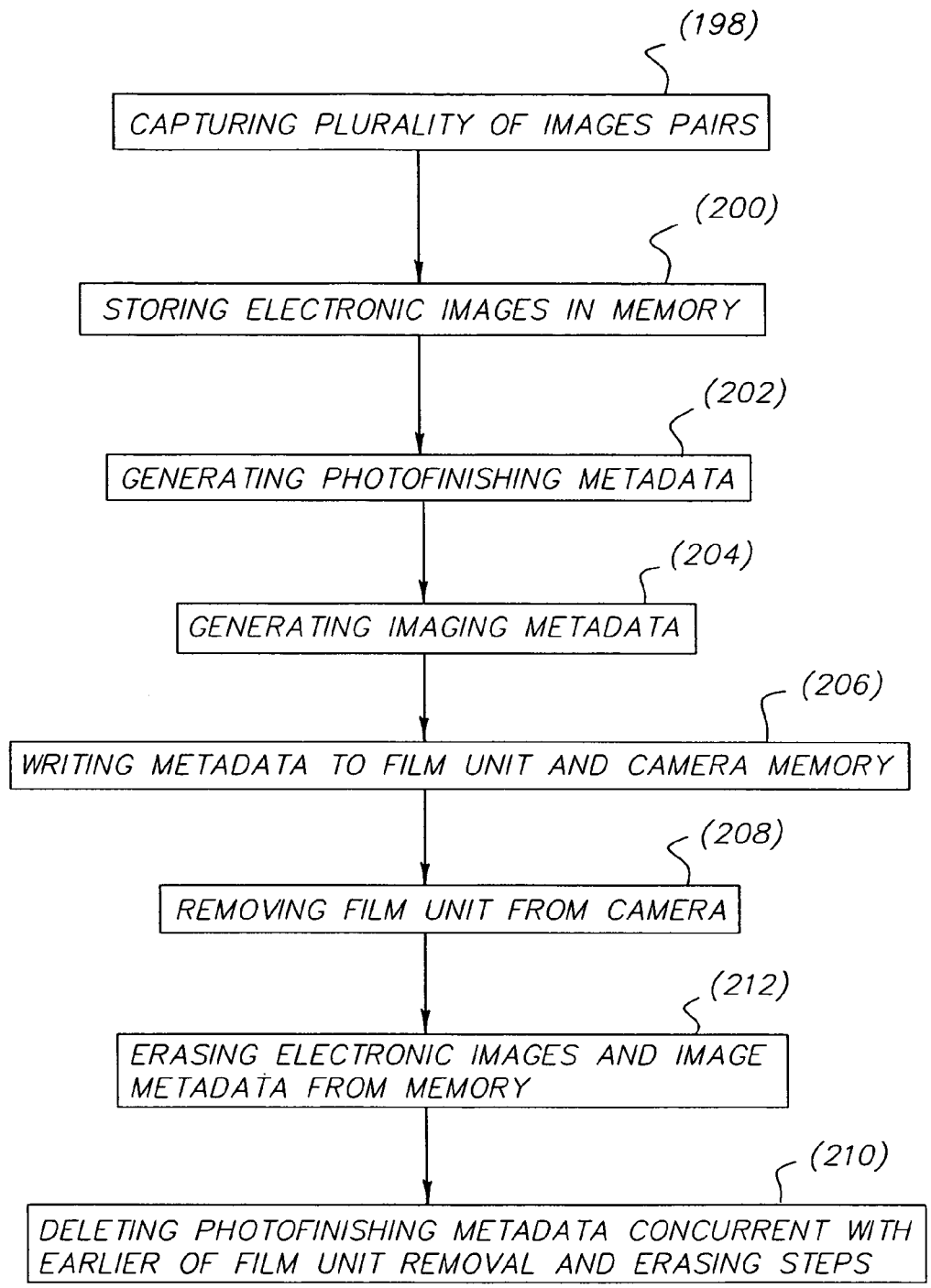
FIG. 8 is a flow chart of an embodiment of the method for revised stored metadata at film unit removal.

The method of revising stored metadata at film removal is illustrated in FIG. 8. A plurality of the archival image-evaluation image pairs are captured (198) by the camera 10. The electronic images of the image pairs are stored (200) in memory 112. Photofinishing metadata for the image pairs is generated (202), as is (204) image metadata for the image pairs. The generation of metadata for individual image pairs can be at the time of capture or later during user review of the electronic images shown on the image display. The metadata is written (206) to the camera memory 112 when generated. The metadata is written (206) to the film unit 18 at that time or later, as elsewhere discussed. The film unit 18 is then removed (208) from the camera 10. The photofinishing and image metadata written to the film unit 18 is retained there for later reading by photofinishing equipment. The film unit removal (208) is preferably after the film unit has been filled to capacity with archival images, but can occur before that time if the camera provides mid-roll interchange.

If desired, with a camera that provides mid-roll interchange, the treatment of metadata provided by this method can be limited to only completed film units. This function can be provided in a camera that uses APS film units, by first reading the number of film frames available using the film unit reader-writer. The camera controller can then count down film frame usage exposure by exposure.

Following the unloading (208) of the film unit 18, the photofinishing metadata for the image pairs having archival images in that film unit, is irreversibly erased (210) from memory. Following the irreversible erasure of photofinishing metadata, is the sequential, irreversible erasure (212) from memory of the electronic images themselves and the corresponding imaging metadata for those electronic images.

The photofinishing metadata can be irreversibly erased from memory when the corresponding film unit is unloaded. With a camera that uses a FIFO overwriting queue; however, it is more convenient to move the photofinishing metadata to the head of the FIFO overwriting queue. In that case, the photofinishing metadata is reversibly erased from memory when the film is unloaded. The photofinishing metadata is irreversibly erased by overwriting, when additional electronic images are captured and written to memory.

The terms "irreversibly erase" and "irreversibly delete" are used herein as equivalents, as are the terms "reversibly erase" and "reversibly delete". Reversible erasure refers to the equivalent of erasure or deleting on a personal computer; that is, the removal of a file from ordinary access without loss or destruction of the information in it. As with files in personal computers, files in the camera memory are irreversibly erased when overwritten by other information, such as another image or metadata or non-information content like a sequence of zeros.

The electronic images corresponding to the archival images in the unloaded film unit and corresponding image metadata are moved to the tail of the FIFO overwriting queue when the film unit is removed. Those electronic images and their image metadata may or may not be reversibly erased at the same time as being moved to the FIFO overwriting queue. Non-erasure allows the user to review earlier electronic images and their corresponding image metadata after removal of the film unit. The user can also download those images at that time. The reversible erasure of the electronic images and image metadata corresponding to a removed film unit is simpler, since the only images that can be viewed are those corresponding to the film unit currently in the camera.

In either case, an additional complexity is added if the camera can capture both image pairs and electronic images without corresponding film images (also referred to herein as "electronic-only images"). Such electronic-only images can be handled in a variety of ways. For example, electronic-only images can be immediately placed at the tail of the FIFO overwriting queue. Alternatively, electronic-only images can be blocked from overwriting until downloaded, in the same manner that electronic images corresponding to latent images on a loaded film unit are blocked from overwriting until the film unit is unloaded from the camera. Electronic-only images are handled in the FIFO overwriting queue and the same manner as other images with the exception that any and all metadata is considered to be image metadata, since there is no corresponding film unit.

The electronic images and corresponding image metadata are irreversibly erased following the irreversible erasure of the photofinishing metadata, as memory space is needed to store additional images and metadata. The order in which electronic images and corresponding image metadata are erased irreversibly from memory can be varied by changing the FIFO order of different types of images. For example, the camera can provide that when film is removed from the camera, any electronic image with print quantity set to zero, is moved to the head of the FIFO overwriting queue.

Figure 9:
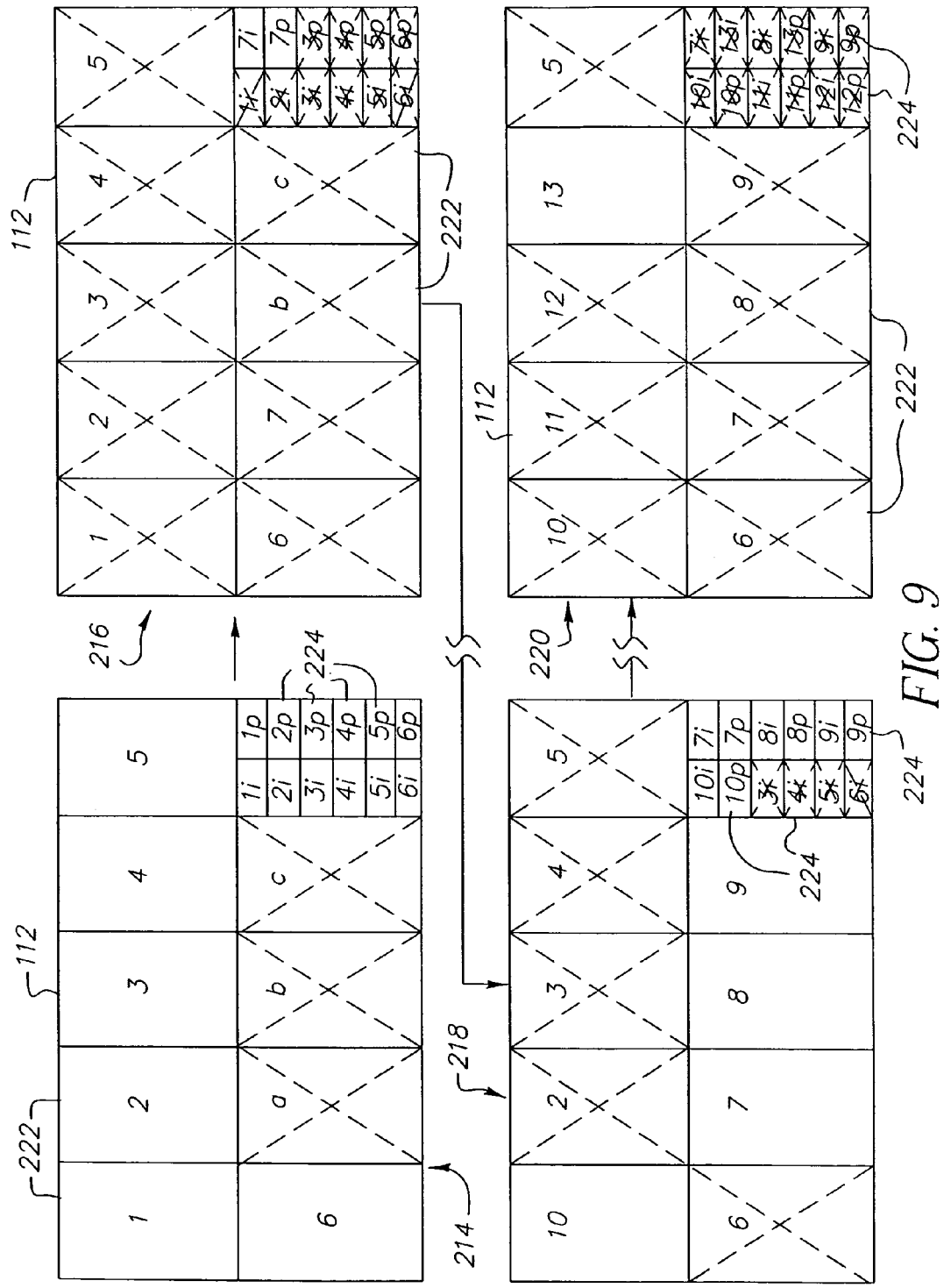
FIG. 9 is a diagrammatical view showing how metadata and electronic images in memory are overwritten in an embodiment of the method of FIG. 8.

FIG. 9 illustrates, in diagrammatical form, how the metadata and electronic images in memory are overwritten. In the embodiment shown in FIG. 9, images and image metadata are erased reversibly when the corresponding film unit is removed from the camera. (Reversible information is shown in FIG. 9 covered by a dashed line "X", which indicates that the respective information or image is blocked from user access. An embodiment that did not provide for such reversible erasure of images and image metadata at film removal would appear the same, with the exception that the dashed line X's would only be present on the photofinishing metadata after film removal, indicating that only the photofinishing metadata was blocked from user access.

FIG. 9 shows the memory at four different stages: a first stage 214 at completion of a first film unit, a second stage 216 part-way through a second film unit, a third stage 218 further through the second film unit, and a fourth stage 220 beginning a third film unit. The FIFO overwriting queue at each stage is shown in Table 1. In FIG. 9, memory 112 is illustrated as a rectangle. Units of memory 112 are allocated for electronic images in blocks 222 of uniform size. Metadata is stored in subblocks 224 divided out of the larger blocks 222. Each block 222 has twelve subblocks 224. Blocks 222 are identified by the sequence number of the corresponding image pair. (These numbers are sequential based on time of capture (a, b, c, 1, 2, 3 . . . ) and are otherwise arbitrary. Frame numbers were not used so as to avoid duplication.) Subblocks 224 are identified by the sequence number of the corresponding image pair and by the letter "i" (indicating image metadata) or "p" (indicating photofinishing metadata).

TABLE 1

FIFO OVERWRITING QUEUE
(Order is top (head) to bottom (tail) in each column)

| Stage 1: completion of film unit 1 | Stage 2: part-way through film unit 2 | Stage 3: further through film unit 2 | Stage 4: beginning film unit 3 |
|---|---|---|---|
| image a | 3p | image 2 | 9p |
| image b | 4p | image 3 and 3i | 10p |

TABLE 1-continued

FIFO OVERWRITING QUEUE
(Order is top (head) to bottom (tail) in each column)

| Stage 1: completion of film unit 1 | Stage 2: part-way through film unit 2 | Stage 3: further through film unit 2 | Stage 4: beginning film unit 3 |
|---|---|---|---|
| image c | 5p | image 4 and 4i | 11p |
|  | 6p | image 5 and 5i | 12p |
|  | image b | image 6 and 6i | image 5 |
|  | image c |  | image 6 |
|  | image 1 and 1i |  | image 7 and 7i |
|  | image 2 and 2i |  | image 8 and 8i |
|  | image 3 and 3i |  | image 9 and 9i |
|  | image 4 and 4i |  | image 10 and 10i |
|  | image 5 and 5i |  | image 11 and 11i |
|  | image 6 and 6i |  | image 12 and 12i |

The relative locations in memory 112 of different blocks 222 and subblocks 224 shown in FIG. 9 are a matter of convenience in this explanation and are otherwise of no consequence. For simplicity in this explanation, the memory 112 shown in FIG. 9 has a total of ten blocks 222 and is used with film units 18 that each have six film frames. Blocks 222 and subblocks 224 are illustrated as physical subdivisions of memory. In an actual camera, blocks 222 and subblocks 224 can be physical units or can be logical units that are defined by, in effect, piecing together portions of physical memory as needed, or can be some combination of the two.

In this explanation of FIG. 9, electronic images and the corresponding image metadata are only erased at film removal. In actual use, this may not be the case. For example, user controls (not individually illustrated) can be provided on the camera which would allow the user to erase any electronic image and corresponding image metadata prior to film removal or rearrange the order of the FIFO overwriting queue. As another example, electronic images corresponding to a film unit not in memory can be reassigned to the head of the FIFO overwriting queue at the end of downloading. Similarly, electronic images can be erased and moved to the head of the FIFO overwriting queue when corresponding latent images have the print order number reduced to zero by the user. Temporary additions to and subtractions from the FIFO overwriting queue could be illustrated in a drawing like FIG. 9 as temporary additions to or subtractions from the available blocks 222 and subblocks 224 of memory. To simplify the illustration, this has not been done.

In the embodiment shown in FIG. 9, electronic images are reversibly erased when a corresponding film unit is removed. Electronic images remain viewable, but, as in FIG. 7b, are shown with indicia that indicates the erased status. The "Erased" indicia is symbolized in respective blocks and subblocks of FIG. 9 by an "X". The electronic images corresponding to a removed film unit can, alternatively, remain fully viewable until being overwritten (irreversibly erased) by an electronic image of a succeeding film unit. In that case, it is preferred that some other indicia, such as, "Prior film unit" or "Electronic image only" notify the user of the status of the images in the FIFO queue in the same way as the "Erased" indicia. Images originally captured as electronic-only images can be treated in the same way as images corresponding to prior film units.

Referring to FIG. 9, electronic images of archival image-electronic image pairs of a first film unit are stored in the indicated numerical order, as is the corresponding metadata. Space is provided in memory for electronic images and metadata corresponding to all of the film frames on a film unit. For simplicity of illustration, specific blocks are shown as being allocated for use as metadata subblocks as needed. The user can review any and all of the electronic images and change user selectable metadata as desired, while the film unit is in the camera. As earlier noted, some metadata is not user selectable, because it is defined by the capture event. For example, the time and date are also defined. (Editable metadata is not necessarily limited to photofinishing metadata and non-editable metadata is not necessarily limited to image metadata.)

The first stage 214 illustrated in FIG. 9 shows the state of memory after the completion of capture of the six image pairs. There are six latent images in the film unit (not shown) and six corresponding electronic images (images 1–6) stored in memory along with image metadata (1i–6i) and photofinishing metadata (1p–6p) corresponding to each of the image pairs. In addition, the memory has three blocks which each hold an earlier image (blocks a–c). Images in blocks a–c are in the FIFO overwriting queue with the image in block a at the head or start of the overwriting queue and the image in block c at the tail or end of the overwriting queue.

Following user review of electronic images and user changes to the metadata, if any; the film unit is removed (not illustrated) and electronic images 1–6 and corresponding metadata is reversibly erased. In so doing, the controller assigns the photofinishing metadata for images 1–6 to the start of the FIFO overwriting queue, before or after earlier images a, b, and c. Images 1 through 6 and corresponding image metadata are moved to the end of the FIFO overwriting queue, in sequential order.

A new film unit is loaded in the camera, and a seventh image is captured. (The seventh image is the first image in the second film unit.) This is the second stage shown in FIG. 9. Image a has been overwritten by image 7. Photofinishing metadata for the seventh image (7i and 7p) is stored in some of the subblocks freed up by the erasure of the photofinishing metadata for images 1–6 (1p–6p). As shown in FIG. 9, photofinishing metadata for images 1 and 2 (1p and 2p) has been overwritten by metadata for image 7 (7i and 7p). Referring to Table 1, at stage 2, the start of the FIFO overwriting queue has photofinishing metadata 3p, 4p, 5p, and 6p and images b and c. The FIFO queue continues with images 1 through 6 and corresponding image metadata 1i–6i.

FIG. 9 does not show separate stages for the capture of images 8 and 9, but continues with the third stage following capture of image 10, which overwrites image 1. Metadata for image 10 overwrites image metadata for images 1 and 2. The FIFO queue, at this point, is limited to images 2–6 and image metadata for images 3–6. Image capture and overwriting continues in a similar manner for images 11 and 12, with image 11 overwriting image 2 and image 12 overwriting image 3. Following capture of image 12, the second film unit is replaced by the third film unit. This results in the assignment of images 6–12 and corresponding metadata to the FIFO queue. The photofinishing metadata is again assigned to the head of the queue and the images and image metadata to the tail of the queue. In stage 4, image 13 has been recorded over image 4. Metadata for image 13 has been recorded over 7p and 8p.

This procedure can be varied, for example, by adding additional space in memory for metadata. It will be apparent that images and corresponding image metadata are not necessarily irreversibly erased at the same time. If this presents a risk of confusing the user, access to images that do not have corresponding image metadata can be denied. In FIG. 9, metadata is always written to the same block. Metadata can overwrite old images if more space is needed than would be available in subblocks previously used for metadata or if all space is made available using a common FIFO queue and reassignment into blocks and subblocks as needed.

Metadata overwrites earlier electronic images only as needed. Similar results can be achieved for memory that has metadata stored within image files, however, the files have to be accessed, the metadata has to be removed, and the files have to be rewritten to memory without metadata. This can be performed in the same manner as with a personal computer. A particular file is opened, the file is edited to remove metadata, and the file is saved again to memory. The saving can overwrite the earlier file and, thus, irretrievably destroy the metadata for the file, or can be rewritten to a different physical location leaving the earlier copy of the file, including the metadata, for replacement as a matter of course in a FIFO queue. Procedures and results are otherwise comparable to those earlier discussed.

In any case, with the approach shown in FIG. 9, photofinishing metadata is erased, reversibly or irreversibly, when a film unit is removed. The specific event used to trigger this erasing is tied to completion of use of the film unit, but is otherwise not critical. For example, metadata can be erased when film is rewound, or when the film door is opened, or when film is removed, or even when the new film unit is loaded. It is currently preferred that metadata is erased from memory as a part of a final process of writing the metadata to a film unit. Such a final process can write metadata for the last image pair captured or can write all of the metadata from storage in memory to the film unit for the first time, depending upon the camera.

Optional Selective Clearance of Electronic Images Upon Film Unit Removal

A camera that stores electronic images in a FIFO overwriting queue like that earlier discussed, presents a problem in some uses, in terms of privacy and security. Electronic images in the camera are not overwritten until replaced by later images. The earlier images are available for review either by simply pushing the verify button of the camera, or, in the case of reversibly erased images, by accessing the memory using a recovery program comparable to those available for retrieval of erased images in a personal computer. With uses requiring security of image, retrieval of erased images presents a risk, even if camera disassembly is required to access the erased images.

Figure 10:
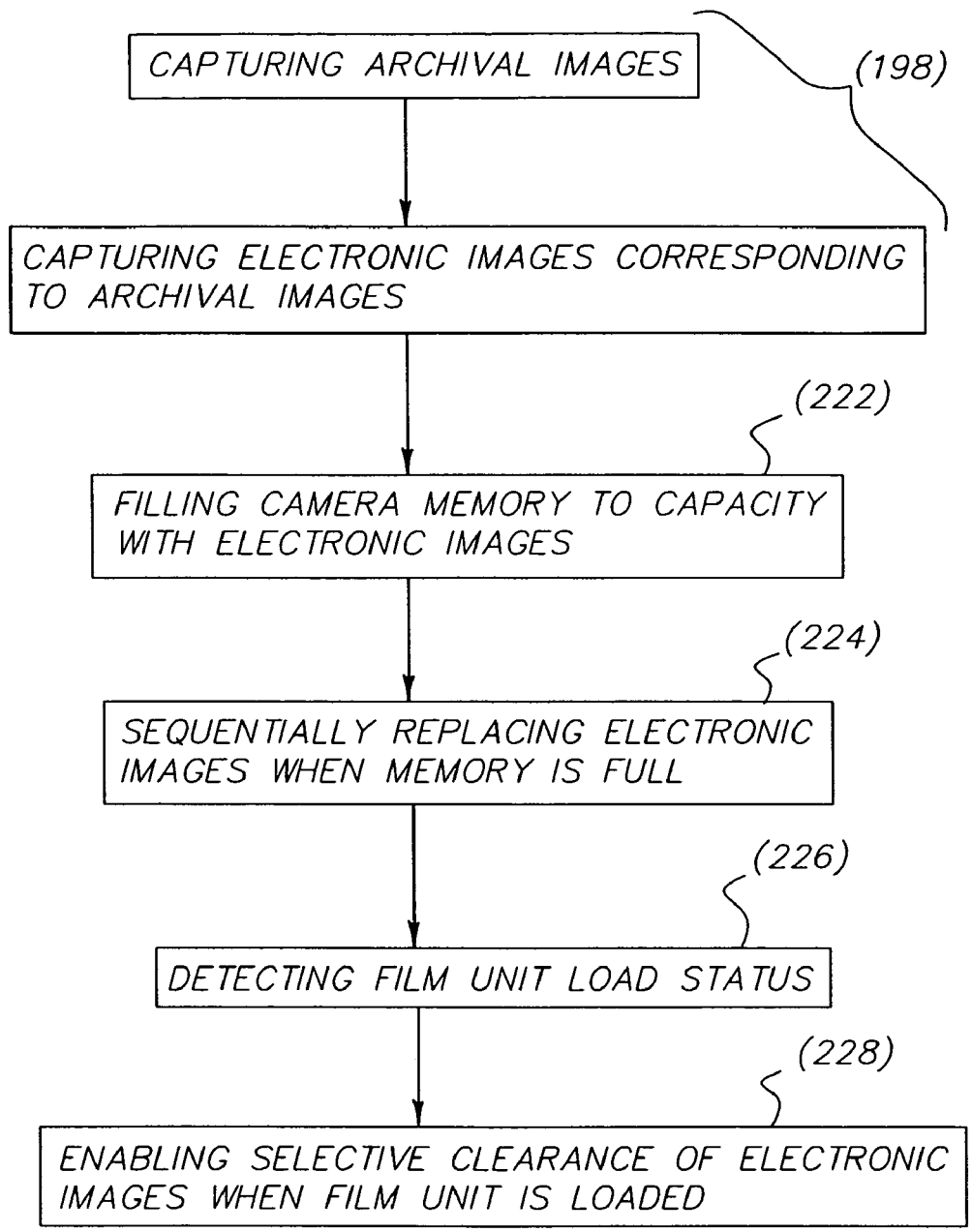
FIG. 10 is a flow chart of an embodiment of the method for selective clearance of electronic images upon film unit removal.

In a modification of the cameras and methods earlier described, this problem is solved by allowing selective clearance of electronic images by the user. Referring now to FIG. 10, image pairs are captured (198). Each image pair includes a latent image and corresponding electronic image of the same scene. The camera memory is filled (222) to capacity with the electronic images. The electronic images are sequentially replaced (224) when full. This is preferably in a FIFO order using the FIFO overwriting queue earlier discussed. The film unit 18 load status is tracked to determine when the film unit corresponding to electronic images in memory, is removed. When this is detected (226), the selective clearance (228) of those electronic images is enabled. The user can then clear selected electronic images.

Electronic images in the FIFO overwriting queue can be reversibly erased or unerased. In the method here, it is highly preferred that all images present in memory are fully reviewable by the user; since the user cannot otherwise easily identify which electronic images are present in memory.

As in embodiments earlier discussed, while the film unit 18 is present in the camera 10, the controller 36 precludes irreversible erasure of electronic images corresponding to film images in the loaded film unit. The signaler 150 signals the controller 36 when the film unit 18 is removed. At that time, selective clearance of the electronic images in memory 112 is enabled.

The terms "clear" and "clearance" and the like, are used herein in the same sense as the term "irreversible erasure", to refer to reversible erasure of a file followed by overwriting with other information. The term "clearance" is used rather than "irreversible overwriting" to identify those situations in which the overwriting information is not a later image or metadata, but rather dummy data that is meaningless or unimportant, such as a string of zeros or some other repeated text string or image data for a blank screen or a test pattern or the like. The dummy data may or may not have some ancillary meaning, but is used here for the purpose of overwriting existing information. If desired, the overwriting information can include or trigger a message on a display to the effect that the respective memory has been cleared.

When an electronic image is cleared from memory, metadata relating to the image is erased. The metadata can be reversibly erased, but it is preferred that the metadata is cleared, since this treats metadata for an electronic image in the same manner as the image and adds an additional small increment of security and privacy. In particular embodiments, clearance of an image and its metadata can also include erasure of previously used filenames or the equivalent in a file allocation table or the like. Such erasure can include overwriting of filenames. This may be unnecessary if the controller assigns arbitrary designations as filenames, but may be desirable if filenames are derived from the date and time of image capture.

What remains after clearance can be referred to as "empty space" since any data present is not meaningful. After clearance, the empty space is assigned to the head of the FIFO overwriting queue and is reused as needed. Software is available commercially for personal computers that provides clearance of selected files. The data set that is used to overwrite preexisting information in personal computers is likewise unimportant and can be, for example, a string of zeros. As with the software of personal computers, the camera can overwrite a prior file once during clearance or can use a more rigorous procedure to overwrite multiple times if security of information is a critical issue and the type of memory used would otherwise possibly retain some of the information that was present in the original file. In currently preferred embodiments of the camera, the memory used is electronic and is only overwritten a single time during clearance.

Referring to FIG. 1, the camera 10 here is like those earlier discussed, with the exception that the signaler 150 is not optional, since the signaler 150 is required to provide an indication to the controller 36 when a film unit 18 has been removed so that the controller 36 can then enable clearance. The camera 10 also provides user controls 144 that allow the user to clear images when desired.

Figure 11:
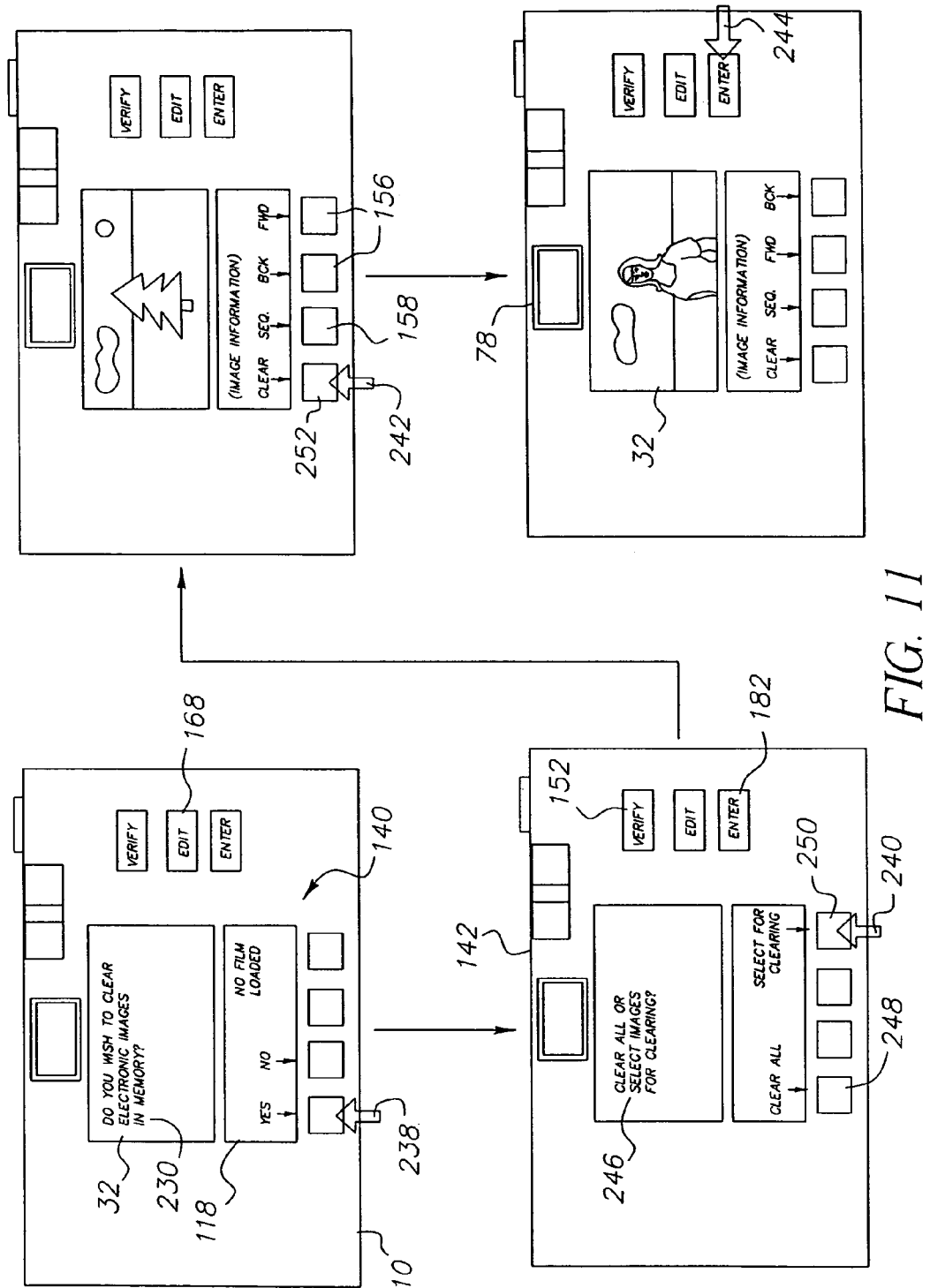
FIG. 11 is a diagrammatical view showing how electronic images in memory are cleared in an embodiment of the method of FIG. 10.

FIG. 11 illustrates use of an embodiment of the camera 10 in which the image display 32 and the information display 118 are used for instructions and software defined user controls. In this embodiment, when a film unit 18 is removed, a message 230 is provided on one of the displays of the user interface 140 that asks whether the user wishes to clear electronic images in memory. Separate buttons 232,234 are defined for yes and no. To help the user understand current status, a status message 236 can also be provided that indicates that no film is loaded. As with the other embodiments discussed herein, icons or other indicia can be used in place of one or more of the described alphanumeric messages.

If the user actuates the button 234 for "No" (not shown), then the camera resumes a capture ready state. In preferred embodiments, the image display 32 is deactivated in the ready state. The information display 118 is activated and indicates capture related information including the fact that no film is loaded.

In FIG. 11, the user actuates the user control 232 for "Yes". (User actions are indicated by arrows 238,240,242, 244 in FIG. 11.) The user interface then displays a message 246 asking whether the user wishes to clear all of the electronic images in memory or only selected images. The user is presented with software defined user controls 248, 250 for two choices "Clear all" and "Select for clearing". If the user selects "Clear all" (not shown), then all electronic images in memory are cleared and the camera returns to the ready state. In FIG. 11, the user actuates the "Select for clearing" button 250. The user interface 240 then presents an electronic image on the image display 32 and, on the information display 118, provides defined user controls 156 and 158 for stepping forward and backward through the images and changing sequence, as above discussed. Image information, such as date and time or capture, can be provided on the information display. (This is indicated in FIG. 11 by "<image information>".) The image information is derived from image metadata stored in memory.

A clearance control 252 is provided to allow the user to clear the displayed image. In FIG. 11, the clearance control 252 is a software defined button. The user selects (indicated by arrow 242) to clear the image shown. The user interface next shows the succeeding image. The user sequences through the remaining electronic images (not shown), clearing images as desired. When done clearing images, the user changes the camera to the ready state, by pressing the enter button 182 (indicated by arrow 244). An automatic return to the ready state, following a period of inactivity, can optionally also be provided, using a timer (a clock 254 of the controller 36).

Figure 12:
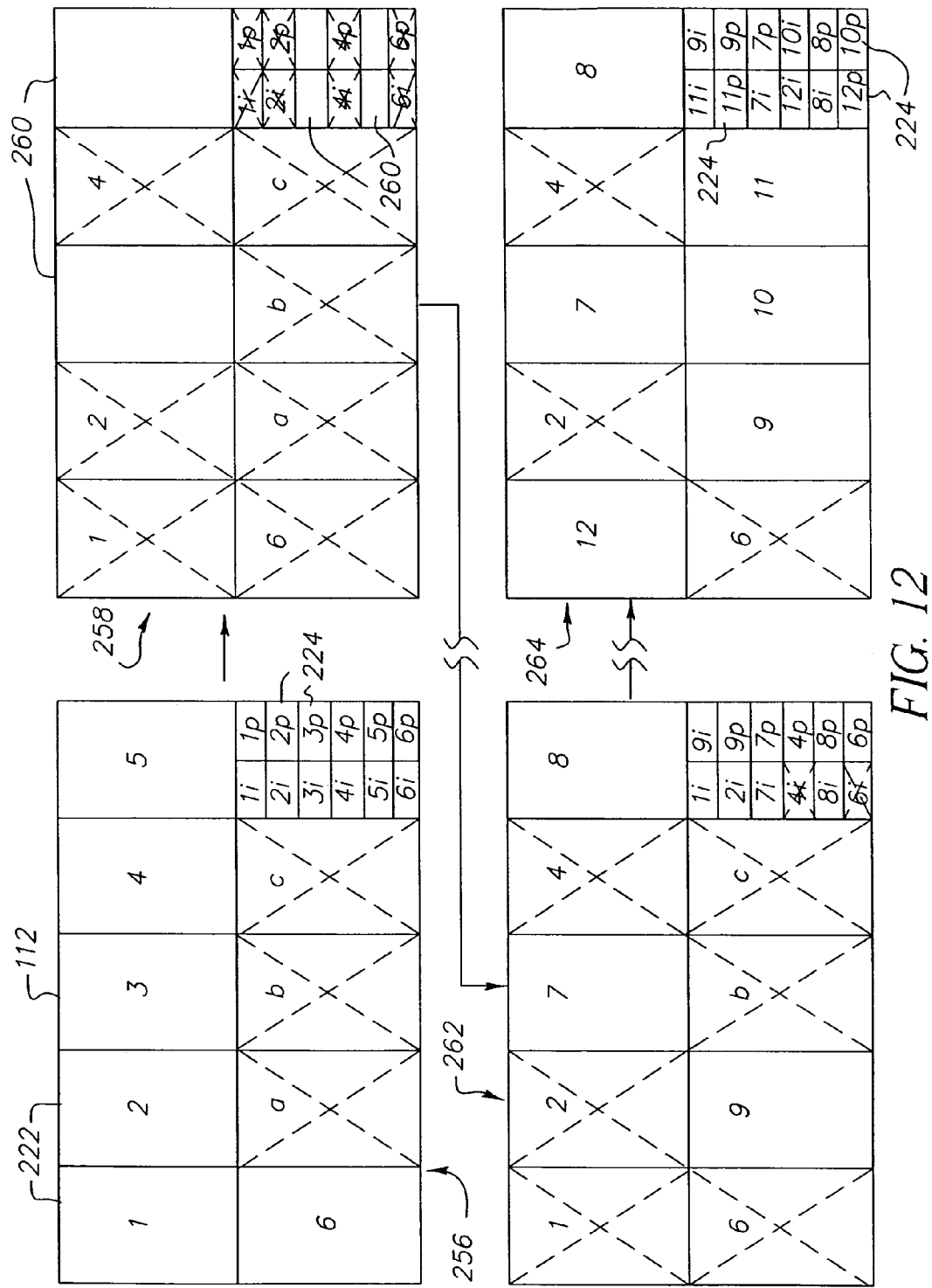
FIG. 12 is a diagrammatical view showing how metadata and electronic images in memory are overwritten in an embodiment of the method of FIG. 10.

Referring now to FIG. 12, the effect of optional selective clearing on the overwriting queue is illustrated. The queue is simplified in the same manner as in FIG. 9, such that the memory has a total of ten blocks and the camera is used with film units that each have six film frames. Metadata is stored and handled in the same manner as earlier discussed in relation to FIG. 9. In the embodiment shown in FIG. 12, electronic images are reversibly erased when a corresponding film unit is removed.

At the first stage 256 in FIG. 12, the memory 112 holds six electronic images (1–6) from a currently loaded film unit 18 along with corresponding metadata (1i–6i, 1p–6p). The memory 112 also has three electronic images a–c, from an earlier film unit. In the second stage 258, the film unit corresponding to electronic images 1 through 6 has been removed. Photofinishing metadata (1p–6p) corresponding to images 1 through 6 has been erased. The user has selectively cleared electronic images 3 and 5. In this embodiment, the corresponding metadata (3i, 3p, 5i, 5p) for images 3 and 5 is also cleared. Cleared images and corresponding metadata are replaced by empty space 260. Images 1, 2, 4, 6, 8, and c remain in memory.

At the third stage 262, a new film unit has been loaded in the camera. Images 7–9 have been captured. Images 7 and 8 are stored in the formerly empty space that had earlier been used by images 3 and 5. Image 9 overwrites electronic image a. Metadata for images 7–8 is stored in formerly empty space. Metadata for image 9 is stored in place of photofinishing metadata (1p–2p) for images 1 and 2.

In the fourth stage 264 shown in FIG. 12, additional images 10–12 have been captured. Images 10 and 11 overwrite images b and c and image 12 overwrites electronic image 1. Metadata overwrites earlier metadata in the same manner as discussed above in relation to FIG. 9.

The camera can, optionally, be configured to give the user the choice of capturing image pairs in a film unit or electronic-only images that lack a corresponding latent image in the film unit. In this case, the camera can enable clearance of electronic-only images at all times or only under certain conditions. For example, the camera could enable clearance of electronic-only images only following removal of a film unit or the camera could preclude clearance of electronic-only images until those images were downloaded. The camera can provide for both selective clearing of electronic-only images and selective reversible erasure of electronic-only images, as discussed above, in relation to FIG. 9.

Demonstration Mode

Figure 13:
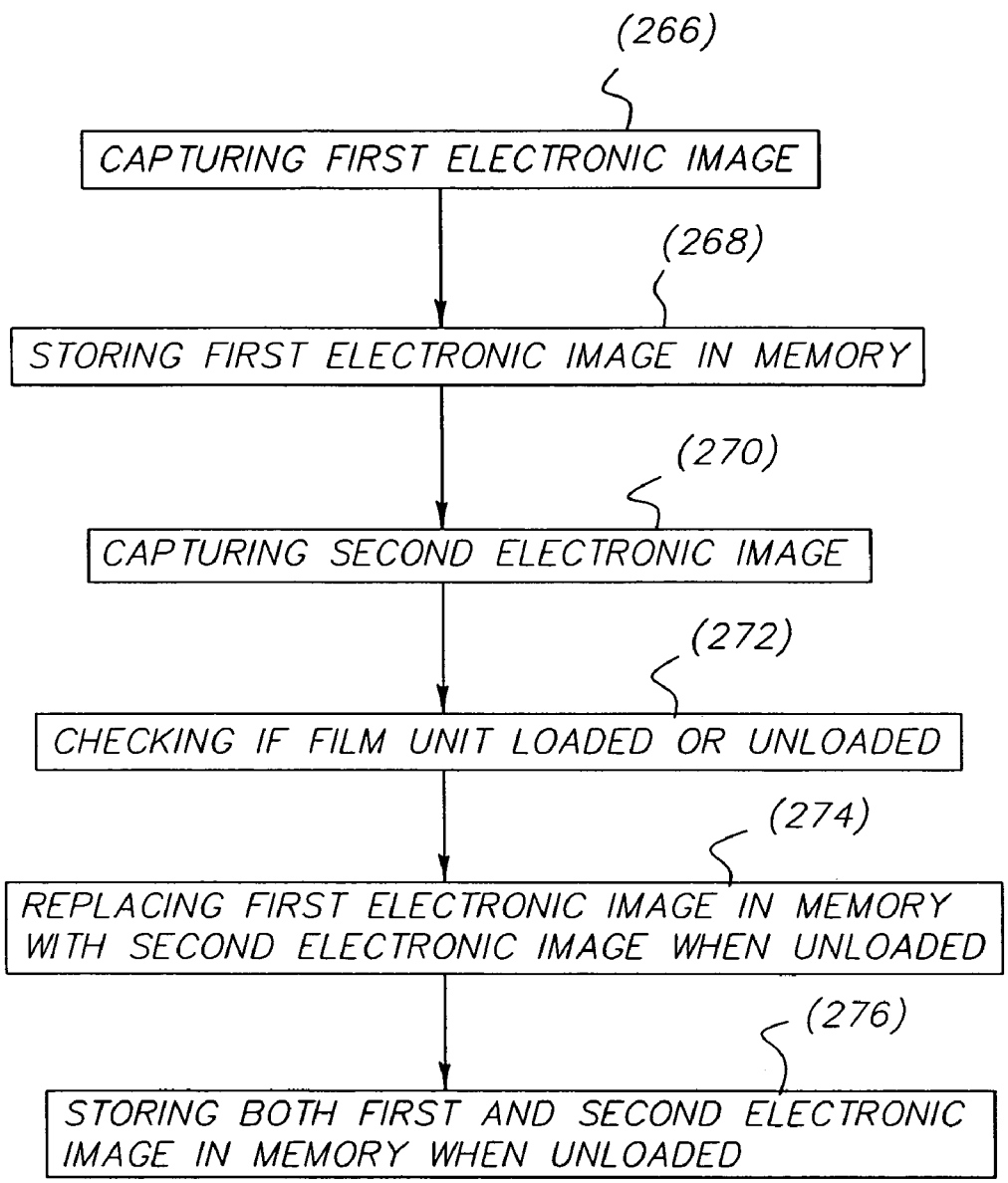
FIG. 13 is a flow chart of an embodiment of a method for handling images in an embodiment of the camera having a demonstration mode.
Figure 14:
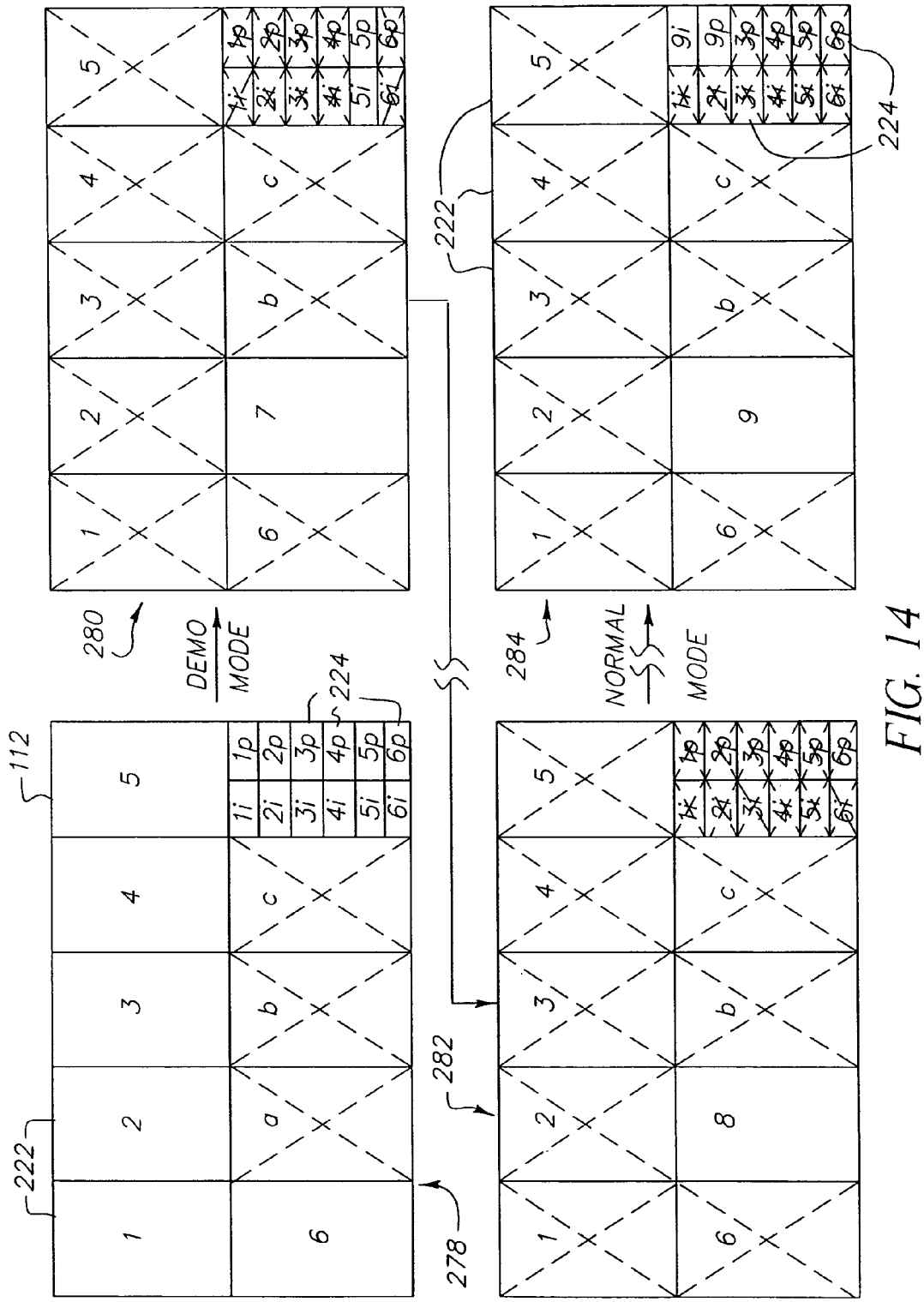
FIG. 14 is a diagrammatical view showing how metadata and electronic images in memory are overwritten in an embodiment of the method of FIG. 13.
Figure 15:
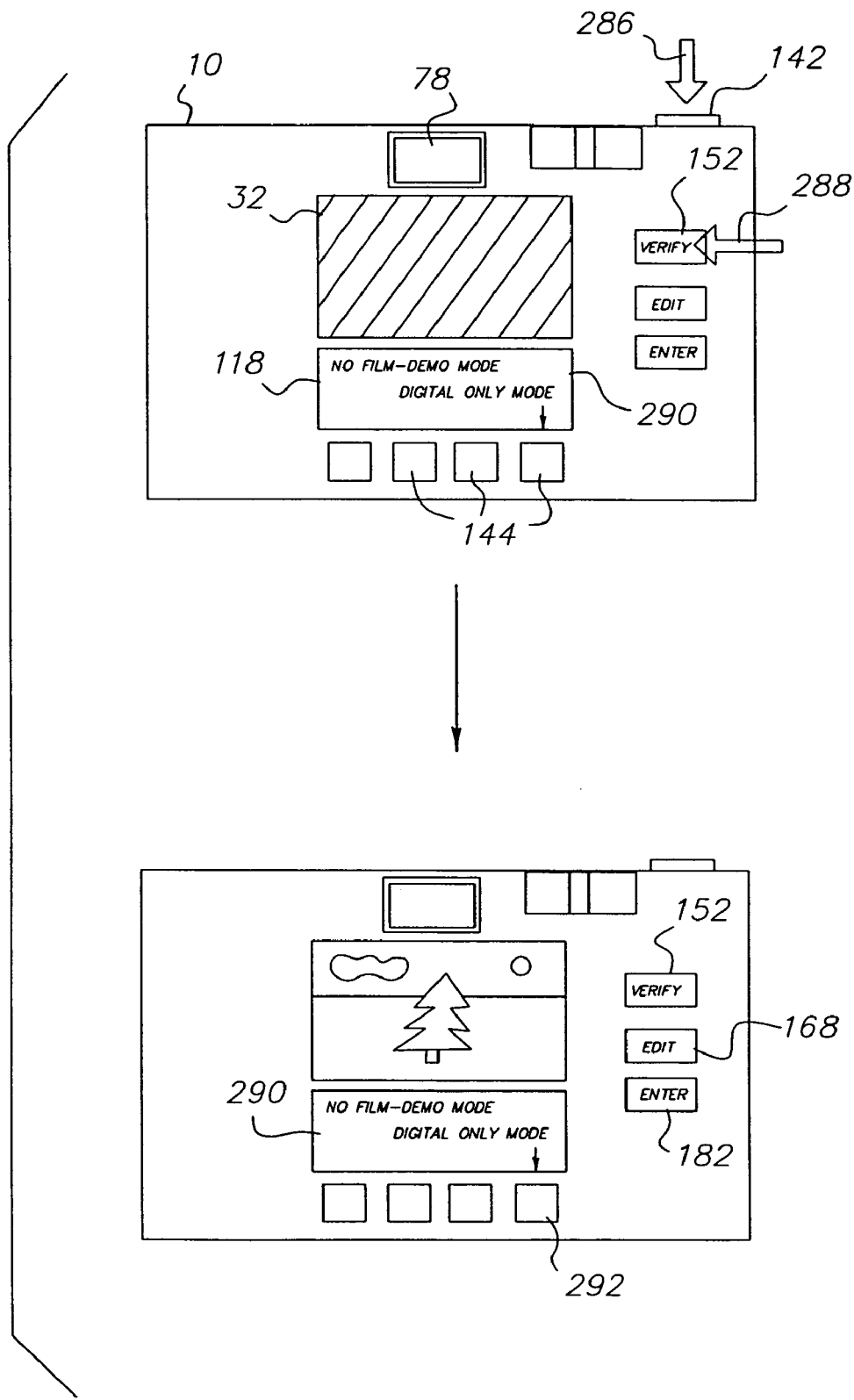
FIG. 15 is a diagrammatical view showing the camera operation in demonstration mode.

Referring now to FIGS. 13–15, in a particular embodiment, the camera has one or more normal modes, in which images are captured and stored as earlier described, and a demonstration mode in which a captured electronic image is immediately overwritten by the next captured image. Other images in memory are not affected. In demonstration mode, the overwriting of the last captured image occurs even if there is empty space available in memory. This continues indefinitely until the camera is taken out of demonstration mode and returned to a normal mode. At that time, the last captured demonstration image is overwritten first, and then images in the overwriting queue are overwritten in sequence, as above described.

In the following discussion, the camera is discussed in terms of a single normal mode in which images are captured on film and as a corresponding electronic image. The camera can be so limited or, alternatively, can have more than one normal mode. For example, the camera can have a first, digital capture only, normal mode and a second, digital and film capture, normal mode.

The method is illustrated in FIG. 13. A first electronic image is captured (266) and stored (268) in memory. A second electronic image is captured (270). The camera 10 checks (272) for the presence of a loaded film unit 18. This checking can be continuous or can rely on a logic flag (not shown) set by the signaler 150 when a film unit is unloaded. If no film unit is present, then the camera is in a demonstration mode and the first electronic image in memory 112 is replaced (274) by the second electronic image. This can be an overwriting or, alternatively, the first electronic image can be cleared and the second electronic image can be written into memory separately. If a film unit is present, then the camera is in a normal mode and the images are handled in a normal manner and both the first and second electronic images are stored (276) in memory.

Referring now to FIG. 14, the operation of the demonstration mode in relation to the overwriting queue is illustrated. The queue is simplified and shown in the same manner as in FIGS. 9 and 12. In the embodiment shown in FIG. 14, electronic images are reversibly erased when a corresponding film unit is removed.

At the first stage 278 in FIG. 14, the memory 112 holds six electronic images from a currently loaded film unit along with corresponding metadata. The memory also has three electronic images, a–c, from an earlier film unit. The film unit having images corresponding to electronic images 1–6 is removed and the camera switches to demonstration mode.

At the second stage 280 shown in FIG. 14, an electronic image, image 7, is captured in demonstration mode. Image 7 replaces the image at the head of the overwriting queue, image a. Metadata is not captured in demonstration mode and, thus, no overwriting of metadata occurs.

At the third stage 282 shown in FIG. 14, another demonstration mode electronic image, image 8, has been captured. Image 8 replaces image 7.

The camera is switched back to a normal mode and another electronic image, image 9, is captured in the fourth stage 284 shown in FIG. 14. Image 9 replaces the last demonstration mode image.

In a particular embodiment of the invention, a last demonstration mode image is erased at the end of a demonstration session. A demonstration session is deemed as ended when the display is inactivated. This occurs when the camera is inactivated, or switched to a capture mode, or the image display only is inactivated by the user or a timer. Upon reactivation of the inactivated image display or camera, the camera is in a default mode, which is preferably a capture mode and more preferably a hybrid film and electronic capture mode. The erasure of the demonstration mode image can be reversible or irreversible. If reversible, it is preferred that access to the demonstration mode image be circumscribed by requiring extraordinary measures on the part of the user. This approach, of treating nonvolatile memory as if it were volatile memory in some situations, reduces the risk of confusing the user as to the status of temporary images captured in the demonstration mode.

The controller 36 of the camera 10 in this embodiment is modified to provide the control and display functions of the demonstration mode. The camera 10 enters the demonstration mode when the camera 10 remains activated after film unit 18 removal and when the camera 10 is turned on and no film is present in the film holder 52.

A picture is taken and then reviewed in the demonstration mode, in the same manner as in the normal picture taking modes. Referring to FIG. 15, the shutter release 142 is pressed (indicated by arrow 286) and then the verify button 152 is pressed. No image is shown on the image display 32 until the verify button 152 is pressed (indicated by arrow 288) and the image display 32 is inactivated by the controller 36 when the verify button 152 is again pressed or after a brief period of inactivity.

Electronic images captured in the demonstration mode can be displayed on the image display 32 in the same manner as other images. It is preferred that the controller 36 preclude access to images in the demonstration mode other than the last captured image. This simplifies a demonstration of camera functions and, in addition, prevents user confusion as to whether a demonstration mode image has been saved in the same manner as normal mode images.

Thus, in FIG. 15, no image is initially shown on the image display 32. Only the last captured demonstration mode image is shown in the demonstration mode. Other electronic images in memory 112 are unavailable unless the camera 10 is taken out of demonstration mode. For example, referring to FIG. 15, the camera could be placed in editing mode by the user pressing the edit button 168.

It is preferred that the camera 10 indicate to the user when it is in demonstration mode, whether or not an image is being shown on the image display. In the embodiment shown in FIG. 15, the information display carries the message "NO FILM-DEMO MODE" 290 at all times while the camera is in demonstration mode. In this embodiment, the camera also has the optional feature of being switchable into a digital only capture mode when no film is present. The camera has a software defined user control 292 which includes the information display caption "Digital only mode". This digital mode switch 292 can be pressed to switch the camera from the demonstration mode to the digital only mode.

Stored Electronic Image Conversion to Selected Geometric Format

In the cameras disclosed herein, while a film unit is in the camera, corresponding electronic images stored in memory have been the same geometric format as the film frame on which the corresponding film image is recorded. This allows the user to review an electronic image and make changes in geometric format, such as changing the ordered print format for film prints either at the time of capture, after capture, or at some later time prior to removal of the film unit. As earlier discussed, after a film unit has been unloaded, corresponding electronic images can remain in the camera and can be subject to review and downloading.

In particular embodiments, the cameras 10 provide stored image conversion when the film unit is removed. The stored electronic images associated with a film unit are automatically converted from a default geometric format to the designated geometric format in memory, when the film unit is removed from the camera. This conversion saves memory space. This approach also prevents possible later user confusion, since the user might otherwise attempt to change the format of photofinished prints, after film removal, without realizing that the effort only changed the electronic images. This approach relies on the user's earlier decision on geometric format when downloading an electronic image after film removal rather than asking the user for a repetition of that decision. There is also no ultimate loss of image information, since the full format image is retained on film, which can be scanned to provide electronic image in whatever resolution is desired, whenever needed.

The feature here of reducing the size of electronic images to match selected cropping of images in a film unit, is dependent upon use of a film unit that the captures images in a default aspect ratio and allows the user to selectively define an aspect ratio for a photofinished prints or other final image. The final image is then produced by cropping the original captured film image at photofinishing. It is highly preferred, that the film unit retains all of the image information of the originally captured film image. This allows the user to later change aspect ratio decisions and produce final images in other aspect ratios. The following discussion is primarily directed to changes in geometric format limited to changes in APS "C", "H", and "P" print formats and corresponding image aspect ratios, but the same considerations apply to other types of film units and geometric format changes. The features here are, however, also suitable for other electronic cropping, whether in a standardized or individually selected manner. For example, images can be zoomed and cropped or cropped and rotated. This is particularly apt if the film unit uses digital storage media instead of photographic film. For convenience, in the following discussion, the features here are generally discussed in terms of APS film units. Other film units can be utilized, with similar or different types of cropping in a like manner.

The stored electronic image conversion is illustrated by FIGS. 1, 6, and 16–17. Image pairs are captured (198) in the camera 10 and stored (200) in memory 112 and in a film unit 112 having archival media. The user then changes the geometric format of one or more of the image pairs. Ordinarily this is done by the user calling up stored electronic images, reviewing those images on the display, changing the displayed images to the various aspect ratios, and inputting selections of desired aspect ratios.

FIG. 6 illustrates selective alteration of APS print formats in an embodiment of the camera. In edit mode, a visible indication of the selected "C" and/or "H" and/or "P" print format(s) is shown on the information display 118. Preferably, the image display 32 also shows the electronic image in cropped form matching the aspect ratio of the selected "C", "H", or "P" print format recorded on the film. The user presses the format designator 172 to view a displayed image in a changed aspect ratio and presses the Enter button 182 while a desired aspect ratio is indicated, to record that aspect ratio with the respective image pair. The controller 36 is operatively connected to the format designator 172. In response to entry of geometric format changes, software and hardware of the controller 36 that act as a memory writer 294 record a print format in memory 112. The controller 36 also causes the film writer/reader 184 to record the print format in the film unit 18.

As earlier discussed, geometric formats that are unchanged have a default value. It is preferred that the default geometric format correspond to the full image capture on the archival media. In particular embodiments using APS film, the electronic image associated with an exposed film frame loaded in the camera is stored in memory as a full image in H format.

After geometric formats have been input by the user, the controller records (296) the geometric format information in the memory 112. The geometric format information is also recorded (298) in the film unit 18. As earlier discussed, this can occur whenever the geometric format ratio of an image pair is changed or, alternatively, can be delayed until just before the film unit is removed from the camera. In this latter case, the geometric format information is temporarily stored in memory. Geometric format information associated with electronic images of the image pairs stored in the memory can be used for this purpose or duplicate information can be provided.

Figure 16:
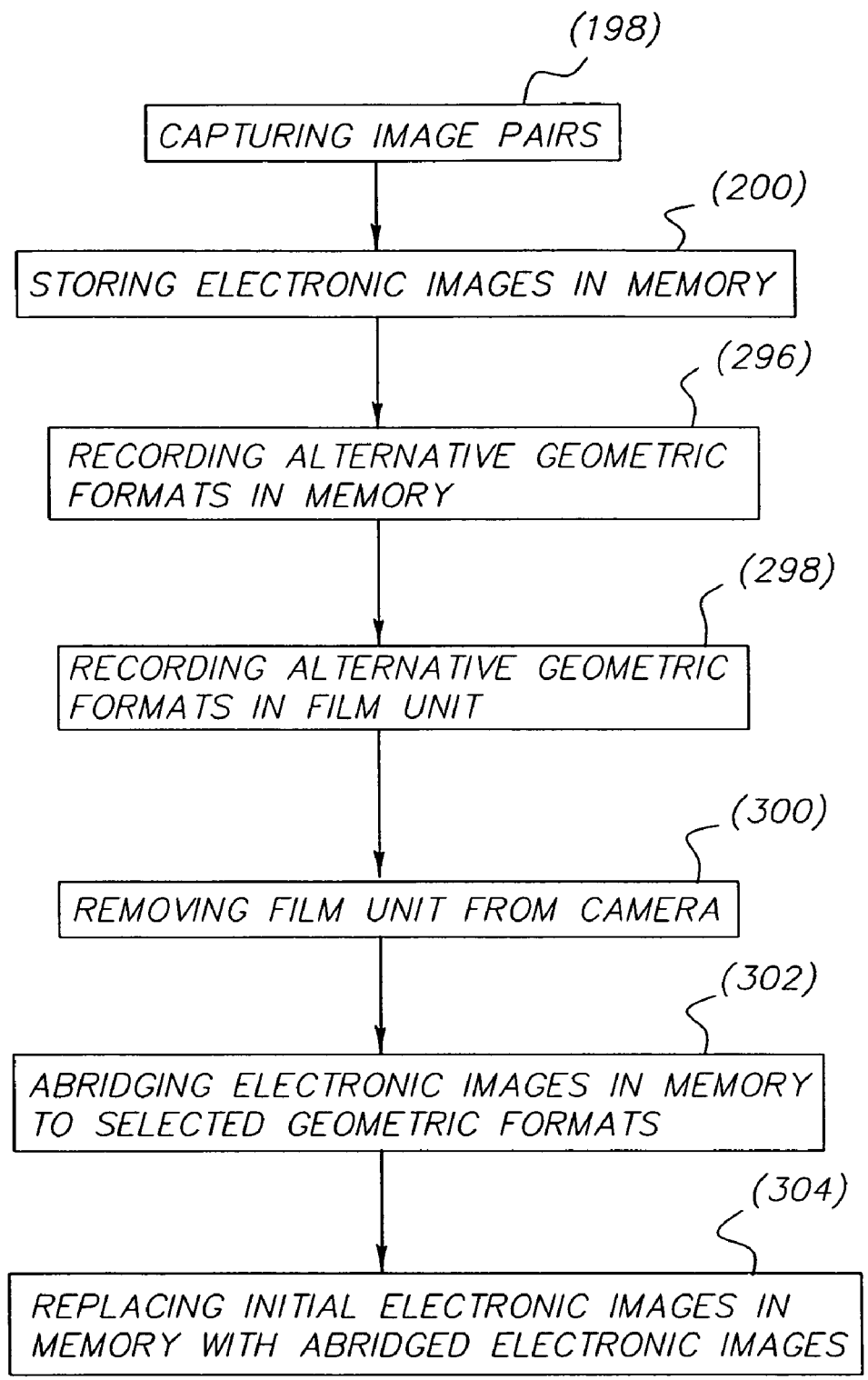
FIG. 16 is a flow chart of an embodiment of a method for converting stored electronic images to a selected aspect ratio.
Figure 17:
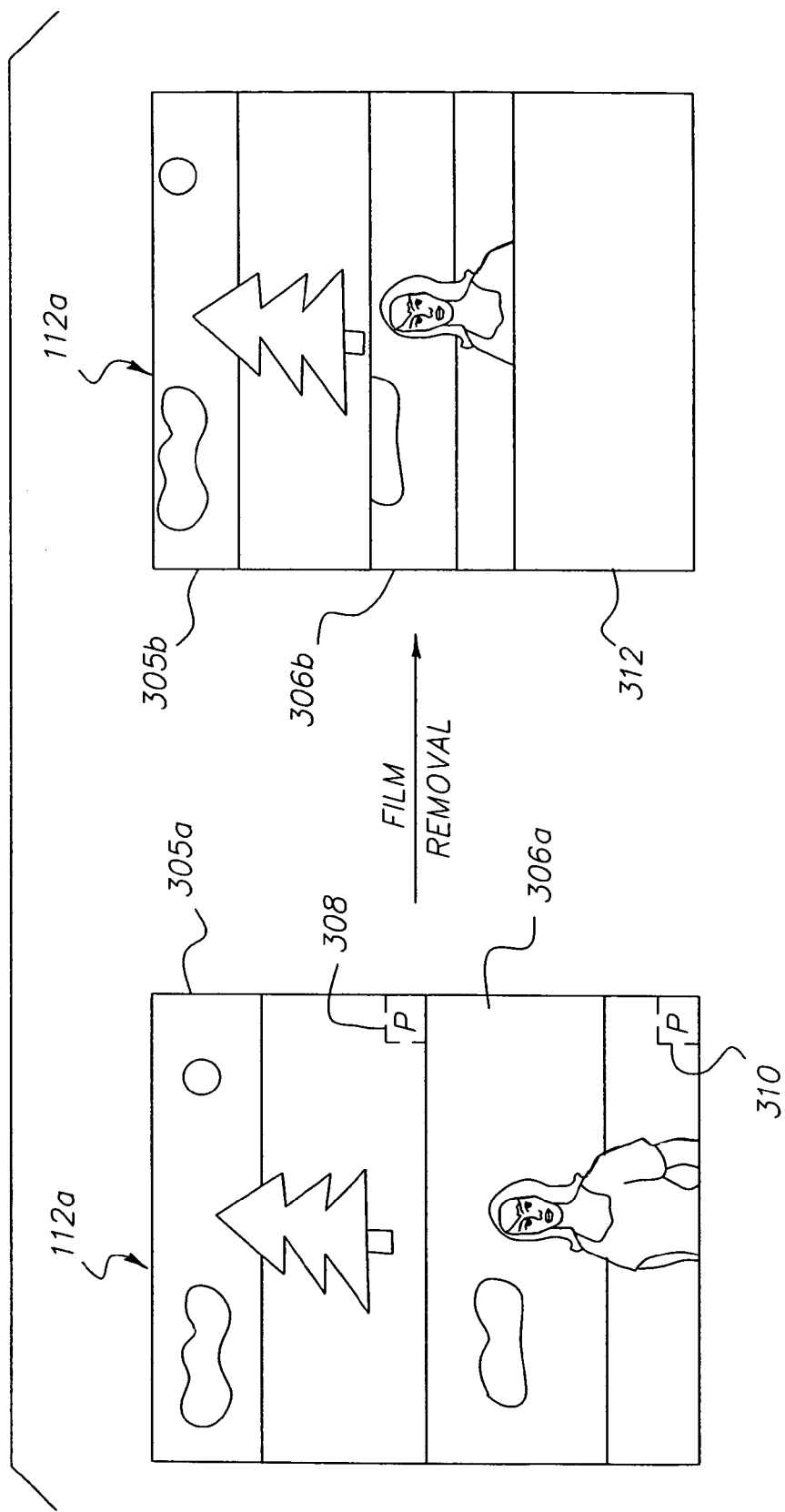
FIG. 17 is a diagrammatical view showing conversion of stored electronic images in the method of FIG. 16.

The film unit 18 is next removed (300) from the camera 10 and electronic images in memory 112 are abridged (302) to selected geometric formats. Referring now to FIGS. 1 and 16–17, the controller has software and hardware that act as an abridgement unit, which abridges respective electronic images to convert the image files to the respective geometric formats of the image pair. When a film unit is removed from the camera, the electronic images in memory are abridged to a smaller size if the respective geometric format indicates that the user has selected a cropped final image. The abridged electronic images replace (304), in memory 112, respective initial electronic images; resulting in an increase in available memory space.

FIG. 17 illustrates this, in simplified diagrammatical form, for a memory 112 having space for two H format images 305a, 306a. The memory 112 also holds photofinishing metadata 308,310 for each of the electronic images that indicates that the selected aspect ratio is P. (This is illustrated in FIG. 17 by a capital latter P within a dashed line border.) After the film unit has been removed from the camera, the controller crops the electronic images 305a, 306a so as to include only those parts of the original image that correspond to a P format final image. The controller then records the resulting abridged electronic images 305b,306b in memory 112 replacing the original images 305a,306a in memory 112 with the abridged images 305b,306b. The metadata 308,310 indicating the P format is redundant at this time and is preferably discarded to free up additional space in memory 112. Other photofinishing related metadata, such as prints ordered, saved in memory with the print format metadata can be deleted at the same time. FIG. 17 shows that replacing the initial electronic images 305a,306a with the abridged electronic images 305b,306b, which are cropped to P format, free up a large block of additional space 312 in memory.

Electronic images are illustrated in the figures as if the image data formed a viewable image in memory. This is a matter of convenience in explanation and is useful for illustrating a relative size of an image in memory and how that size can be reduced by cropping (eliminating information for some part of the image). As a further convenience, images are illustrated here as all being of the same size, unless cropped. This should not be understood to suggest that the cameras and methods herein are limited to simplified memory management schemes resembling the figures, nor that the memory is limited to simplified storage schemes of uncompressed image files or image files subject to uniform compression.

Discussion here is primarily directed to a film unit that is removed from the camera only after all of the image capacity of the film unit has been filled. The camera can, optionally, also provide for mid-roll change (also referred to as mid-roll interrupt). This is a feature of some APS cameras. In that case, the camera can treat a mid-roll change of a film unit as a removal of the film unit. Alternatively, the camera can treat a mid-roll change as a non-removal event. In that case, abridgement of electronic images only occurs when a fully filled film unit is unloaded from the camera. The latter approach is not preferred since memory space is not saved. It is preferred, that electronic images be abridged when a film unit is removed for mid-roll change. In that case, the user can return a film unit to the camera after mid-roll change and still change aspect ratios, but the effect of changes cannot be seen on the image display. Alternatively, after returning a film unit to a camera, the user can be precluded from changing geometric formats of images captured on a film unit prior to removal of the film unit for mid-roll change. If desired, a warning can be provided to the user on one or more of the displays of the camera indicating that geometric formats of earlier images will be unchangeable or displayed images will be abridged after a film unit is removed. A similar warning can be provided whenever a completed film unit is removed, if desired. The warning can be presented in any manner, such as by indicia or an audible message using a speaker (not shown) on the camera, or a combination of the two. It is preferred that the warning is easily understood by the user. For this reason, a warning in the form of a simple warning light or the like, is not desirable. A warning in the form of a textual message or easily understood icon is currently preferred. Warning indicia can be presented on the image display or the information display or both.

The camera 10 is like those earlier described and has a signaler 150 that signals the controller 36 when a film unit 18 is unloaded. The manner of operation of the signaler 150 is not critical. The timing of the conversion of the image files in memory to corresponding files cropped to the respective geometric formats, is concurrent with freeing of the film unit from the camera, but is otherwise not critical. For example, this can occur during rewinding of a completed film cartridge or can occur when a new film unit is loaded following removal of the earlier completed film unit. Timing of this conversion can be based upon available processor time and user convenience.

Alternately, the stored electronic image can be converted to the designated geometric format when the image is downloaded from the camera. Conversion at this time may be more convenient since it adds no delays to the rewind and film removal process.

Downloaded Electronic Images Having Reduced Metadata

Figure 18:
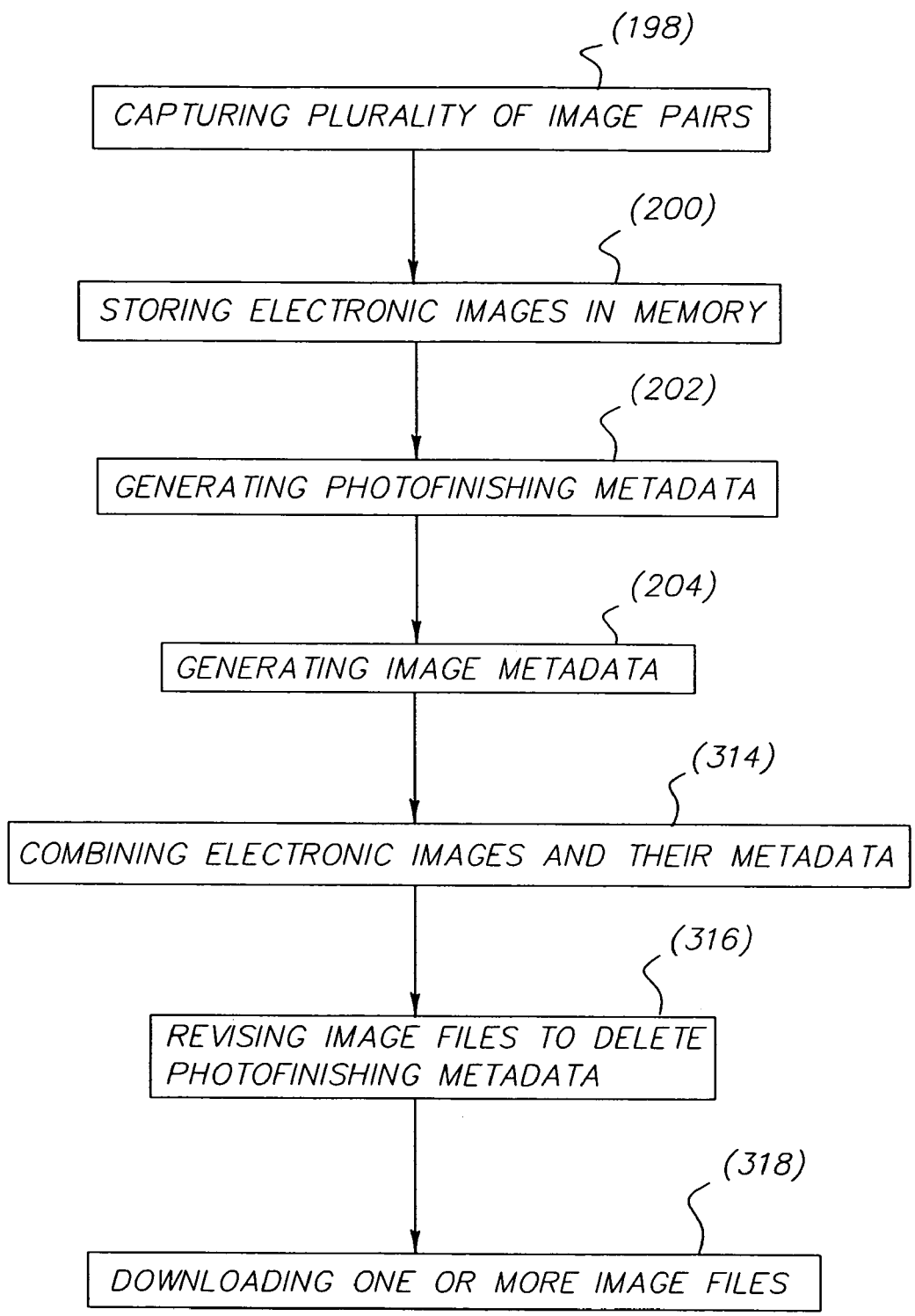
FIG. 18 is a flow chart of an embodiment of a method for downloading image files having reduced metadata.

In particular embodiments, the time required for downloading electronic images is reduced by eliminating from image files metadata relating to photofinishing. Referring now to FIG. 18, the image pairs are captured (198) and electronic images are stored in memory (200). Photofinishing metadata and image metadata are generated (202),(204) and have the same characteristics as earlier discussed. As above discussed, the metadata is generated at capture, or when electronic images are later reviewed. The metadata is stored (314) in memory in association with corresponding electronic images. The metadata is stored in the film unit in association the corresponding archival images.

When a downloading signal is received by the controller of the camera, one or more electronic images are downloaded to a computer, network, or other image manipulation device. To save space in memory of the camera, electronic images can be erased following downloading of those electronic images as downloaded files. The erasure can be reversible or irreversible and is handled in the overwriting queue of memory in the same manner as other erasures earlier discussed. The downloaded electronic images can also be retained in memory without erasure, but with abridgement to the aspect ratio of respective archival images. If the downloaded electronic images are retained, photofinishing metadata can be deleted from memory. The photofinishing metadata is not lost at the time of downloading even if the corresponding electronic image and its associated metadata is erased from the camera at downloading. This is because the photofinishing metadata and image metadata is recorded in the film unit in association with respective archival images. The photofinishing metadata and image metadata is retained in the film unit at least until photofinishing, and preferably after photofinishing also.

It is currently preferred, that downloaded electronic images are provided as image files which include associated metadata. This is illustrated in diagrammatical form in FIG. 21. The image file 311 is like other computer files and has a header 313, image information 315, and metadata 317 assigned to that image information. Electronic images and metadata can be stored in the same manner in the memory of the camera. In the downloaded files, the associated metadata is limited to image metadata. No matter the form, the electronic images and metadata are revised (316) in the camera at downloading (318), as necessary, to limit the downloaded metadata to image metadata.

FIG. 6 illustrates use of a print format designator. Like designators can be provided for other user-changeable metadata, such as number of prints, output selections, captions, and the like. Other metadata is supplied by the controller, such as date and time of capture. The electronic subsystem can include additional components that supply information such as detected ambient lighting to the controller for inclusion in metadata.

As earlier discussed, the camera has a communications port 124 that provides for the passage of signals to and from the controller 36 and an image manipulation device 126, such as a local or networked computer or printer. Communications protocols for this purpose are well known to those of skill in the art, as is the necessary hardware.

Figure 19:
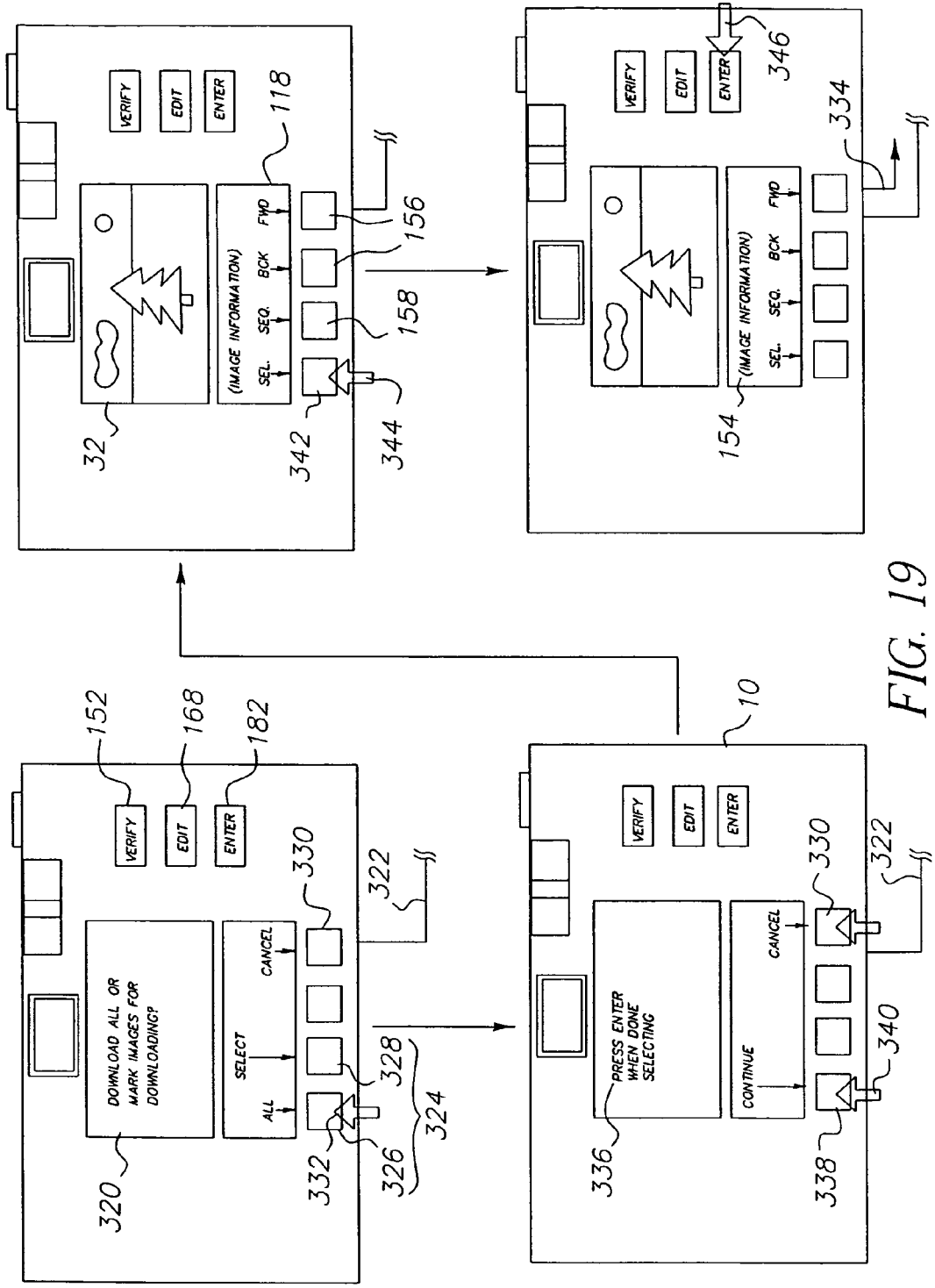
FIG. 19 is a diagrammatical view showing image downloading.

Downloading can be controlled by the image manipulation device 126 via the communications port 124, but it is preferred that the camera 10 have user controls 144 which the user can operate to control downloading. Referring now to FIG. 19, in a particular embodiment, a download message 320 is shown on the image display 32 when the communications port (shown in FIG. 1) is connected to an image manipulation device (symbolized in FIG. 19 by abbreviated line 322). The message 320 asks the user whether all images or selected images are to be downloaded and provides a software defined download control 324 that provides buttons 326,328 for all image and selected images. As is the case with other software defined user controls described herein, a cancel button 330 can be provided to return the camera to an earlier or default state. The download control can be part of the computer or other image manipulation device rather than the camera, but that is not currently preferred. Downloading of all or selected images can be subject to automatic modification using predefined rules. For example, an image can be automatically skipped when photofinishing metadata for the number of prints film of that image is set to zero.

In FIG. 19, the user presses (indicated by arrow 332) the all button 326. The user is then given the opportunity to select individual images for downloading (indicated by arrow 334 in FIG. 19). It is not critical how this is implemented. In FIG. 19, the image display 32 shows a message 336 that indicates that the user should press the Enter button 182 when images have been selected. The camera also provides a software defined continue button 338 that is pressed (indicated by arrow 340) by the user to begin selecting images. The camera then provides as software defined user controls 144: an image selector 156, a sequence control 158, and a download selector 342. The user presses (indicated by arrow 344) the download selector 342 to indicated images for downloading and then presses (indicated by arrow 346) the Enter button to initiate the download 334.

Downloaded Electronic Images Having Cropped Geometric Format

Figure 20:
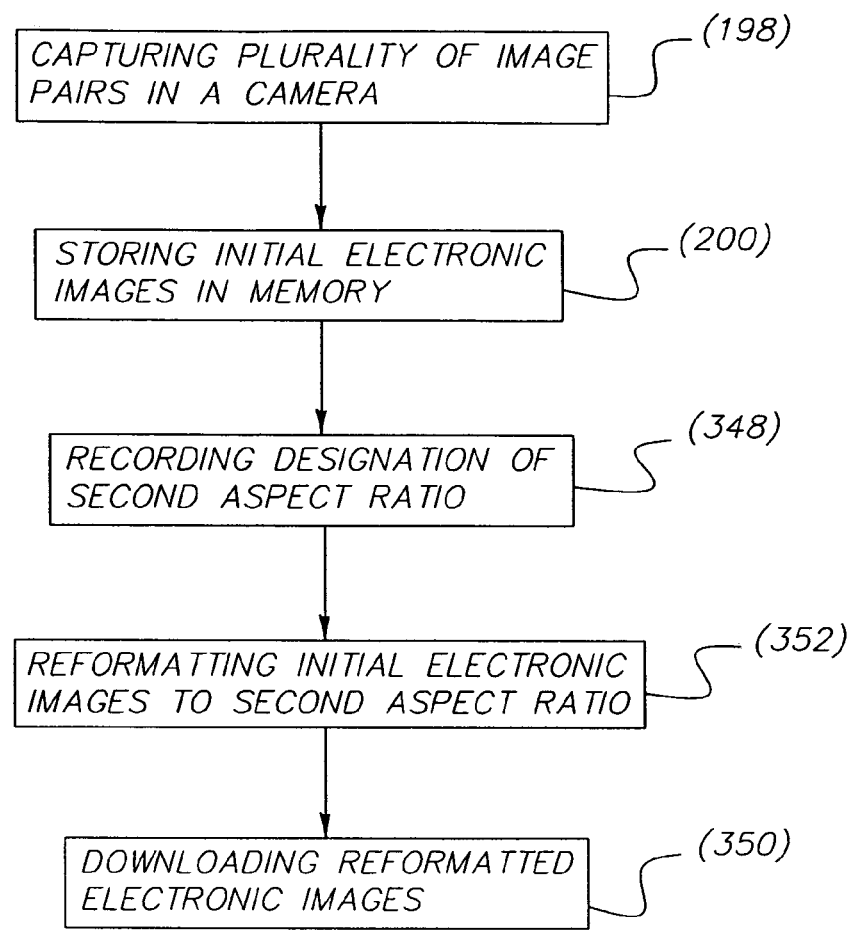
FIG. 20 is a flow chart of an embodiment of a method for downloading image files having aspect ratio cropping.

In particular embodiments, the time required for downloading electronic images is reduced by abridging downloaded electronic images to the geometric format of the corresponding archival image. Referring now to FIG. 20, image pairs are captured (198) in the camera and stored (200) in memory 112. The archival image of each pair and the corresponding initial electronic image have the same initial or default geometric format. (With APS film, this would have the same aspect ratio as print format "H".)

The memory 112 and the film unit 18 each have an indication, for each member of the image pair, of the default geometric format of each image. One convenient form for this default indication is the absence of an entry in metadata, for no change from the default value. At the time of capture or during later review of the images, the user changes the geometric format of one or more of the image pairs to a second geometric format different than the first geometric format. The changed geometric format is recorded (348) in memory and the film unit. An example of a procedure for changing geometric formats of image pairs, in a particular embodiment of the camera using APS film, is discussed above and illustrated in FIG. 6.

Electronic images are later downloaded (350) from memory 112. The downloaded images are reformatted (352) to respective selected geometric formats. Downloading is conducted and uses the same camera features as earlier discussed.

In a particular embodiment, the electronic images are formatted so as to appear in the geometric format selected for the particular image pair, but the downloaded files retain all of the information from the initial electronic images. In this case, the format of images produced from the downloaded files can be changed so as to restore the appearance of respective initial electronic images. This approach provides a convenience in first viewing the downloaded files on a computer or other image manipulation device, since the format first seen is what the user selected; but does not provide the advantage of reducing the amount of information that has to be downloaded.

In a preferred embodiment, the downloaded files are abridged, that is, cropped, to the geometric format selected for the image pair. If an image has the default geometric format selected, then the cropping to the selected geometric format has no effect. With other geometric formats, the electronic images are cropped to a smaller size. This reduces the size of corresponding downloaded image files. This reduction in image content and size decreases the time required for downloading. FIG. 17 illustrates, in diagrammatical form the space saved in memory by cropping image files. Like savings are provided in downloading time and in storage in a computer or other image manipulation device.

Concurrent with downloading, electronic images can be erased in any of the various manners earlier described, if desired.

The invention has been described in detail with particular reference to certain preferred embodiments thereof, but it will be understood that variations and modifications can be effected within the spirit and scope of the invention.

What is claimed is:

1. A method for handling images in a hybrid camera comprising the steps of:
   capturing a plurality of image pairs in a camera, each said image pair having an archival image of a scene and an initial electronic image of the same scene, said archival image of each said pair having a first aspect ratio;
   storing said initial electronic images in memory;
   recording in association with selected image pairs of said plurality, a designation of a alternative aspect ratio different than said first aspect ratio;
   changing said initial electronic images of said selected image pairs to respective said alternative aspect ratios to provide re-formatted electronic images without any reduction in image density; and
   downloading said re-formatted electronic images.

2. The method of claim 1 wherein said re-formatting further comprises adding to said initial electronic images indications of the respective said alternative aspect ratios.

3. The method of claim 2 wherein said initial electronic images are in said first aspect ratio.

4. The method of claim 1 wherein said initial electronic images are restorable from said re-formatted electronic images without any change in image density.

5. The method of claim 1 wherein said first aspect ratio is a different aspect ratio than said alternative aspect ratio and said re-formatting further comprises cropping each of said initial electronic images of said selected image pairs to the respective said alternative aspect ratio to provide abridged electronic images.

6. The method of claim 5 wherein said cropping further comprises replacing in said memory, said initial electronic images of said selected image pairs with said abridged electronic images.

7. The method of claim 6 wherein said abridged electronic images require less space in said memory than the initial electronic images.

8. The method of claim 1 wherein said method further comprises loading a film unit including photographic film in the camera prior to said capturing; said archival images are latent images and said recording further comprises writing said designations to said film unit in association with respective said latent images of said selected image pairs.

9. A method of handling images in a hybrid camera comprising:
   capturing a plurality of image pairs;
   storing initial electronic images having a first geometric format in memory;
   recording designations of at least one aternative geometric format;
   re-formatting at least one electronic image with at least one alternative geometric format;
   downloading said at least one re-formatted electronic image; and
   deleting said electronic images from said memory, concurrent with said downloading of said re-formatted electronic images.

10. The method of claim 1 wherein said method further comprises loading a film unit in the camera prior to said capturing; and said recording further comprises writing said designations of said alternative aspect ratio to said film unit.

11. The method of claim 1 wherein said recording includes writing said designations of said alternative aspect ratio to said film unit in association with respective said archival images and writing said designations of said alternative aspect ratio to said memory in association with respective said electronic images.

12. A method for handling images in a hybrid electronic-photographic film camera comprising the steps of:
   capturing a plurality of image pairs in a camera, each said image pair having a latent image of a scene on photographic film and an initial electronic image of the same scene, said latent image of each said pair having a first aspect ratio;
   storing said initial electronic images in memory;
   assigning one of a plurality of aspect ratios formats to each of said image pairs, said plurality of aspect ratios including said first aspect ratio and one or more alternative aspect ratios, said alternative aspect ratios being different from each other and from said first aspect ratio;
   re-formatting said initial electronic images to respective said aspect ratios to provide re-formatted electronic images without any reduction in image density; and
   downloading said re-formatted electronic images.

13. The method of claim 12 wherein said assigning further comprises writing a designation of said alternative aspect ratios to said photographic film in association with respective said latent images.

14. The method of claim 12 wherein said re-formatting further comprises adding indications of said alternative aspect ratios to respective said initial electronic images.

15. The method of claim 12 wherein said re-formatted electronic images are in said first aspect ratio.

16. The method of claim 12 wherein said initial electronic images are restorable from said re-formatted electronic images without any change in image density.

17. The method of claim 12 wherein said re-formatting further comprises cropping respective said initial electronic images to said alternative aspect ratio without any change in image density.

18. A hybrid camera for use with a film unit, said camera comprising:
   a body;
   an archival capture unit disposed in said body, said archival capture unit selectively capturing archival images in the film unit;
   a designator selectively switchable, in relation to each said archival image, among a plurality of different aspect ratios to define a selected aspect ratio for each said archival image;
   a film writer writing designations of one or more of said aspect ratios to said film unit in association with respective said archival images;
   an electronic capture unit disposed in said body, said electronic capture unit capturing initial electronic images corresponding to said archival images, said initial electronic images being in a first aspect ratio of said plurality of aspect ratios;
   memory storing said electronic images;
   an controller operatively connected to said memory and said designator, said controller re-formatting said initial electronic images to said selected aspect ratios of respective said archival images to provide re-formatted electronic images without any reduction in image density; and
   a communications port operatively connectable to said memory to download said re-formatted electronic images.

19. The camera of claim 18 wherein said controller adds to said initial electronic images, indications of respective said aspect ratios.

20. The camera of claim 18 wherein said controller crops said initial electronic images to respective said aspect ratios without any change in image density.

* * * * *